United States Patent
Gupta et al.

(10) Patent No.: US 10,849,148 B2
(45) Date of Patent: Nov. 24, 2020

(54) GROUP COMMON CONTROL CHANNEL AND BANDWIDTH PART MANAGEMENT IN WIRELESS COMMUNICATIONS

(71) Applicant: QUALCOMM Incorporated, San Diego, CA (US)

(72) Inventors: Piyush Gupta, Bridgewater, NJ (US); Junyi Li, Chester, NJ (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/358,538

(22) Filed: Mar. 19, 2019

(65) Prior Publication Data
US 2019/0297636 A1  Sep. 26, 2019

Related U.S. Application Data

(60) Provisional application No. 62/646,303, filed on Mar. 21, 2018.

(51) Int. Cl.
*H04W 72/12* (2009.01)
*H04W 72/04* (2009.01)
(Continued)

(52) U.S. Cl.
CPC ....... *H04W 72/1273* (2013.01); *H04L 1/1614* (2013.01); *H04L 1/1893* (2013.01); *H04W 72/042* (2013.01); *H04W 72/0453* (2013.01)

(58) Field of Classification Search
CPC ......... H04W 72/1273; H04W 72/0453; H04W 72/042; H04L 1/1614; H04L 1/1893
See application file for complete search history.

(56) References Cited

U.S. PATENT DOCUMENTS 9,226,290 B2  12/2015  Gaal et al.
10,033,488 B2 *  7/2018  Loehr ................... H04W 72/14
(Continued)

OTHER PUBLICATIONS

Huawei et al., "Remaining Issues on Bandwidth Part," 3GPP Draft; R1-1717077, 3rd Generation Partnership Project (3GPP), Mobile Competence Centre, 650, Route Des Lucioles, F-06921 Sophia-Antipolis Cedex, France, vol. RAN WG1, No. Prague, Czech Republic; Oct. 9, 2017-Oct. 13, 2017, Oct. 8, 2017, XP051340268, Retrieved from the Internet: URL:http://www.3gpp.org/ftp/Meetings_3GPP_SYNC/RAN1/Docs/andURL:http://www.3gpp.org/ftp/Meetings_3GPP_SYNC/RAN1/Docs/[retrieved on Oct. 8, 2017], 11 pages, Figures 5,6, par. below Issue 2, Issue 3, Proposal 9.

(Continued)

*Primary Examiner* — Wei Zhao
(74) *Attorney, Agent, or Firm* — Paul Kuo

(57) ABSTRACT

Methods, systems, and devices for wireless communications are described that support group common control channel and bandwidth part (BWP) management in wireless communications. A group downlink control channel transmission may include information from which each user equipment (UE) transmitting a negative acknowledgement (NACK) message can determine its unique retransmission resource assignment and a BWP for the retransmission. Different BWPs may be used for downlink transmissions to different UEs and downlink retransmissions responsive to the NACK messages may be transmitted using the original BWP of the UEs or a different BWP.

30 Claims, 24 Drawing Sheets

(51) Int. Cl.
*H04L 1/18* (2006.01)
*H04L 1/16* (2006.01)

(56) References Cited

U.S. PATENT DOCUMENTS

| | | | |
|---|---|---|---|
| 2012/0113866 A1* | 5/2012 | Tenny | H04W 24/10 370/254 |
| 2018/0176898 A1 | 6/2018 | Yu et al. | |
| 2018/0227096 A1* | 8/2018 | Lim | H04W 72/082 |

OTHER PUBLICATIONS

Intel Corporation: "Resource Allocation and TBS", 3GPP Draft; R1-1716320 Intel TBS_RA, 3rd Generation Partnership Project (3GPP), Mobile Competence Centre ; 650, Route Des Lucioles ; F-06921 Sophia-Antipolis Cedex; France, vol. RAN WG1, No. Nagoya, Japan; Sep. 18, 2017-Sep. 21, 2017, Sep. 17, 2017 (Sep. 17, 2017), XP051339776, 10 Pages, Retrieved from the Internet: URL:http://www.3gpp.org/ftp/Meetings_3GPP_SYNC/RAN1/Docs/ [retrieved on Sep. 17, 2017], p. 8, Option 1.

Partial International Search Report—PCT/US2019/023110—ISA/EPO—dated Jun. 19, 2019 (182432WO).

Huawei, et al., "HARQ Feedback Indication Design for UL Grant-Free Transmission", 3GPP TSG RAN WG1 Meeting #90bis, 3GPP Draft; R1-1717092, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 2, 2017 (Oct. 2, 2017), 5 Pages, XP051352198, Retrieved from the Internet: URL: http://www.3gpp.org/ftp/tsg_ran/WG1_RL1/TSGR1_90b/Docs/ [retrieved on Oct. 2, 2017] p. 2, section 2.2, item 2.

Huawei, et al., "Remaining Details on Group-Common PDCCH", 3GPP TSG RAN WG1 Meeting 90bis, 3GPP Draft; R1-1717063, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 3, 2017 (Oct. 3, 2017), 7 Pages, XP051352570, Retrieved from the Internet: URL: http://www.3gpp.org/ftp/tsg_ran/WG1_RL1/TSGR1_90b/Docs/ [retrieved on Oct. 3, 2017] p. 3, section 2.2, "Group-common PDCCH".

International Search Report and Written Opinion—PCT/US2019/023110—ISA/EPO—dated Oct. 1, 2019 (182432WO).

Xiaomi: "Discussion on the Remaining Issues of Group Common PDCCH", 3GPP TSG RAN WG1 Meeting 90bis, 3GPP Draft; R1-1718461 Discussion on Remaining Issues of Group Common PDCCH, 3rd Generation Partnership Project (3GPP), Mobile Competence Centre; 650, Route Des Lucioles; F-06921 Sophia-Antipolis CE, vol. RAN WG1, No. Prague, CZ; Oct. 9, 2017-Oct. 13, 2017, Oct. 8, 2017 (Oct. 8, 2017), 5 Pages, XP051341643, Retrieved from the Internet: URL: http://www.3gpp.org/ftp/Meetings_3GPP_SYNC/RAN1/Docs/ [retrieved on Oct. 8, 2017] pp. 2-3, section 2.1, "SFI for multiple bandwidth parts".

* cited by examiner

GROUP COMMON CONTROL CHANNEL AND BANDWIDTH PART MANAGEMENT IN WIRELESS COMMUNICATIONS

CROSS REFERENCES

The present Application for Patent claims priority to U.S. Provisional Patent Application No. 62/646,303 by Gupta et al., entitled "Group Common Control Channel And Bandwidth Part Management In Wireless Communications," filed Mar. 21, 2018, assigned to the assignee hereof.

BACKGROUND

The following relates generally to wireless communication, and more specifically to group common control channel and bandwidth part management in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support group common control channel and bandwidth part (BWP) management in wireless communications. Various described techniques provide for use of a group downlink control channel that includes information from which each user equipment (UE) transmitting a negative acknowledgement (NACK) message can determine its unique retransmission resource assignment and a BWP for the retransmission. In some cases, a base station may transmit downlink transmissions to a set of UEs (e.g., ultra-reliable/low-latency communications (URLLC) communications using semi-persistent scheduling (SPS) protocols), and different BWPs may be used for downlink transmission to different UEs (e.g., using preconfigured SPS resources for each UE). The base station may receive NACK messages from a subset of UEs in the set of UEs and downlink retransmissions responsive to the NACK messages may be transmitted using the original BWP of the UEs or a different BWP.

In some cases, the base station may transmit a downlink control message that includes or otherwise provides an indication of a downlink resource configuration and BWP to be used for retransmission of the respective SPS messages. The base station may then retransmit the downlink transmissions to the subset of UEs using the identified BWPs according to the downlink resource configuration. In some cases, the downlink control message may indicate, for each BWP, a bitmap associated with each UE of the BWP and an indication of a number of UEs associated with the BWP for a retransmission, which may be different than an initial number of UEs associated with the BWP for the initial downlink transmissions. Accordingly, the group downlink control message and selection of BWPs for retransmissions may provide a more efficient mechanism for a base station to allocate retransmission resources and provide retransmissions to the subset of UEs.

A method of wireless communication is described. The method may include transmitting a NACK message associated with a downlink transmission from a base station, the downlink transmission having resources in a first BWP of a plurality of BWPs available for downlink transmissions, receiving, responsive to the NACK message, a group downlink control message indicating a downlink resource configuration for a retransmission of the downlink transmission within a second BWP different from the first BWP, and receiving the retransmission of the downlink transmission via the second BWP based at least in part on the downlink resource configuration.

An apparatus for wireless communication is described. The apparatus may include means for transmitting a NACK message associated with a downlink transmission from a base station, the downlink transmission having resources in a first BWP of a plurality of BWPs available for downlink transmissions, means for receiving, responsive to the NACK message, a group downlink control message indicating a downlink resource configuration for a retransmission of the downlink transmission within a second BWP different from the first BWP, and means for receiving the retransmission of the downlink transmission via the second BWP based at least in part on the downlink resource configuration.

Another apparatus for wireless communication is described. The apparatus may include a processor, memory in electronic communication with the processor, and instructions stored in the memory. The instructions may be operable to cause the processor to transmit a NACK message associated with a downlink transmission from a base station, the downlink transmission having resources in a first BWP of a plurality of BWPs available for downlink transmissions, receive, responsive to the NACK message, a group downlink control message indicating a downlink resource configuration for a retransmission of the downlink transmission within a second BWP different from the first BWP, and receive the retransmission of the downlink transmission via the second BWP based at least in part on the downlink resource configuration.

A non-transitory computer-readable medium for wireless communication is described. The non-transitory computer-readable medium may include instructions operable to cause a processor to transmit a NACK message associated with a downlink transmission from a base station, the downlink transmission having resources in a first BWP of a plurality of BWPs available for downlink transmissions, receive, responsive to the NACK message, a group downlink control message indicating a downlink resource configuration for a retransmission of the downlink transmission within a second BWP different from the first BWP, and receive the retransmission of the downlink transmission via the second BWP based at least in part on the downlink resource configuration.

Some examples of the method, apparatus, and non-transitory computer-readable medium described above may further include processes, features, means, or instructions for identifying a group length corresponding to a first number of UEs in a set of UEs that are to receive downlink retransmissions via the second BWP. Some examples of the method, apparatus, and non-transitory computer-readable medium described above may further include processes, features, means, or instructions for determining the downlink resource configuration based at least in part on the group length and an indication of a second number of UEs of the set of UEs that are to receive the downlink retransmissions via the second BWP. Some examples of the method, apparatus, and non-transitory computer-readable medium described above may further include processes, features, means, or instructions for determining a resource assignment for the retransmission of the downlink transmission based at least in part on the downlink resource configuration.

In some examples of the method, apparatus, and non-transitory computer-readable medium described above, the second number of UEs of the set of UEs that are to receive downlink transmissions via the second BWP may be indicated in a bitmap within the group downlink control message. In some examples of the method, apparatus, and non-transitory computer-readable medium described above, the group length of the second BWP may be updated based on the first UE having resources in the first BWP for the downlink transmission and having resources in the second BWP for the retransmission. In some examples of the method, apparatus, and non-transitory computer-readable medium described above, the group length of the first BWP may be updated based on the first UE having resources in the first BWP for the downlink transmission and having resources in the second BWP for the retransmission.

In some examples of the method, apparatus, and non-transitory computer-readable medium described above, the group length of the first BWP remains the same when the first UE has resources in the first BWP for the downlink transmission and has resources in the second BWP for the retransmission, and a third number of UEs of a second set of UEs that are to receive downlink retransmissions via the first BWP may be updated based on the first UE having resources in the second BWP for the retransmission.

Some examples of the method, apparatus, and non-transitory computer-readable medium described above may further include processes, features, means, or instructions for identifying an aggregate number of NACK messages associated with one or more BWPs that may be ordered ahead of the first BWP. Some examples of the method, apparatus, and non-transitory computer-readable medium described above may further include processes, features, means, or instructions for determining, based at least in part on the identified aggregate number of NACK messages, the downlink resource configuration for the retransmission of the downlink transmission. Some examples of the method, apparatus, and non-transitory computer-readable medium described above may further include processes, features, means, or instructions for switching, based at least in part on the downlink resource configuration, to the second BWP.

Some examples of the method, apparatus, and non-transitory computer-readable medium described above may further include processes, features, means, or instructions for determining, based on an indication in a bitmap within the group downlink control message, a number of UEs within the first BWP that are to receive downlink retransmissions, and wherein the switching may be further based at least in part on the bitmap. Some examples of the method, apparatus, and non-transitory computer-readable medium described above may further include processes, features, means, or instructions for receiving an indication of one or more rules to be applied to information included in the group downlink control message in identifying the downlink resource configuration to be used for the retransmission of the downlink transmission.

In some examples of the method, apparatus, and non-transitory computer-readable medium described above, at least one rule includes evenly dividing a set of available resources within the second BWP between one or more UEs that are to receive retransmissions via the second BWP. In some examples of the method, apparatus, and non-transitory computer-readable medium described above, at least one rule includes dividing a set of available resources within the second BWP between one or more UEs that are to receive retransmissions via the second BWP, the dividing based at least in part on a number of resource blocks that are associated with each UE of the one or more UEs.

Some examples of the method, apparatus, and non-transitory computer-readable medium described above may further include processes, features, means, or instructions for selecting, from a preconfigured table of available downlink resource configurations for different BWPs, the downlink resource configuration based at least in part on a number of UEs that are to receive retransmissions via the second BWP. In some examples of the method, apparatus, and non-transitory computer-readable medium described above, the downlink transmission may be a semi-persistent scheduling (SPS) message, and a second SPS message may be received via the first BWP after receiving the retransmission via the second BWP.

A method of wireless communication is described. The method may include transmitting a plurality of downlink transmissions to a plurality of UEs via a plurality of BWPs, wherein a first subset of downlink transmissions are transmitted to a first subset of UEs via a first BWP, receiving NACK messages from two or more of the plurality of UEs, the NACK messages initiating retransmissions of corresponding downlink transmissions to the two or more UEs, dynamically switching a first UE of the two or more UEs from the first BWP to a second BWP different than the first BWP for the associated retransmission to the first UE, the switching based at least in part on a number of UEs of the first BWP and the second BWP that have associated retransmissions, and transmitting a group downlink control message to each of the two or more UEs that indicates a downlink resource configuration for each of the two or more UEs and includes information sufficient for the first UE to identify retransmission resources within the second BWP.

An apparatus for wireless communication is described. The apparatus may include means for transmitting a plurality of downlink transmissions to a plurality of UEs via a plurality of BWPs, wherein a first subset of downlink transmissions are transmitted to a first subset of UEs via a first BWP, means for receiving NACK messages from two or more of the plurality of UEs, the NACK messages initiating retransmissions of corresponding downlink transmissions to the two or more UEs, means for dynamically switching a first UE of the two or more UEs from the first BWP to a second BWP different than the first BWP for the associated retransmission to the first UE, the switching based at least in part on a number of UEs of the first BWP and the second BWP that have associated retransmissions, and means for transmitting a group downlink control message to each of the two or more UEs that indicates a downlink resource configuration for each of the two or more UEs and includes information sufficient for the first UE to identify retransmission resources within the second BWP.

Another apparatus for wireless communication is described. The apparatus may include a processor, memory in electronic communication with the processor, and instructions stored in the memory. The instructions may be operable to cause the processor to transmit a plurality of downlink transmissions to a plurality of UEs via a plurality of BWPs, wherein a first subset of downlink transmissions are transmitted to a first subset of UEs via a first BWP, receive NACK messages from two or more of the plurality of UEs, the NACK messages initiating retransmissions of corresponding downlink transmissions to the two or more UEs, dynamically switch a first UE of the two or more UEs from the first BWP to a second BWP different than the first BWP for the associated retransmission to the first UE, the switching based at least in part on a number of UEs of the first BWP and the second BWP that have associated retransmissions, and transmit a group downlink control message to each of the two or more UEs that indicates a downlink resource configuration for each of the two or more UEs and includes information sufficient for the first UE to identify retransmission resources within the second BWP.

A non-transitory computer-readable medium for wireless communication is described. The non-transitory computer-readable medium may include instructions operable to cause a processor to transmit a plurality of downlink transmissions to a plurality of UEs via a plurality of BWPs, wherein a first subset of downlink transmissions are transmitted to a first subset of UEs via a first BWP, receive NACK messages from two or more of the plurality of UEs, the NACK messages initiating retransmissions of corresponding downlink transmissions to the two or more UEs, dynamically switch a first UE of the two or more UEs from the first BWP to a second BWP different than the first BWP for the associated retransmission to the first UE, the switching based at least in part on a number of UEs of the first BWP and the second BWP that have associated retransmissions, and transmit a group downlink control message to each of the two or more UEs that indicates a downlink resource configuration for each of the two or more UEs and includes information sufficient for the first UE to identify retransmission resources within the second BWP.

Some examples of the method, apparatus, and non-transitory computer-readable medium described above may further include processes, features, means, or instructions for retransmitting the downlink transmission of the first UE using the second BWP. Some examples of the method, apparatus, and non-transitory computer-readable medium described above may further include processes, features, means, or instructions for transmitting, after the retransmitting, a second plurality of downlink transmissions to the plurality of UEs, the second plurality of downlink transmissions including a second downlink transmission to the first UE that may be transmitted using the first BWP.

Some examples of the method, apparatus, and non-transitory computer-readable medium described above may further include processes, features, means, or instructions for identifying a group length corresponding to a first number of UEs of a second subset of UEs associated with the second BWP plus the first UE. Some examples of the method, apparatus, and non-transitory computer-readable medium described above may further include processes, features, means, or instructions for identifying a second number of UEs that are to receive downlink retransmissions via the second BWP based at least in part on the downlink resource configuration. Some examples of the method, apparatus, and non-transitory computer-readable medium described above may further include processes, features, means, or instructions for transmitting the group length and the second number of UEs to the two or more UEs.

In some examples of the method, apparatus, and non-transitory computer-readable medium described above, the second number of UEs that are to receive downlink transmissions via the second BWP may be indicated in a bitmap within the group downlink control message. In some examples of the method, apparatus, and non-transitory computer-readable medium described above, the group length of the second BWP may be updated from a prior group length of the second BWP based on the first UE having resources in the second BWP for the retransmissions. In some examples of the method, apparatus, and non-transitory computer-readable medium described above, the group length of the first BWP may be updated from a prior group length of the first BWP based on the first UE having resources in the second BWP for the retransmissions. In some examples of the method, apparatus, and non-transitory computer-readable medium described above, the group length of the first BWP remains the same as a prior group length of the first BWP when the first UE may have resources in the second BWP for the retransmissions, and a third number of UEs that are to receive downlink retransmissions via the first BWP may be updated based on the first UE having resources in the second BWP for the retransmissions.

Some examples of the method, apparatus, and non-transitory computer-readable medium described above may further include processes, features, means, or instructions for identifying an ordered set of BWPs that are to be used for the retransmissions. Some examples of the method, apparatus, and non-transitory computer-readable medium described above may further include processes, features, means, or instructions for identifying, for each BWP of the ordered set of BWPs, an aggregate number of NACK messages associated with any prior BWPs of the ordered set of BWPs. Some examples of the method, apparatus, and non-transitory computer-readable medium described above may further include processes, features, means, or instructions for determining, based at least in part on the identified aggregate number of NACK messages for each BWP, the downlink resource configuration for the retransmissions of each BWP, where one or more UEs of one or more BWPs for the downlink transmissions may be switched to a different BWP for the retransmissions. In some examples of the method, apparatus, and non-transitory computer-readable medium described above, the downlink resource configuration further comprises a bitmap within the group downlink control message for each BWP that indicates a number of UEs within each BWP that are to receive downlink retransmissions, and the determining may be further based at least in part on the bitmap.

Some examples of the method, apparatus, and non-transitory computer-readable medium described above may further include processes, features, means, or instructions for transmitting an indication of one or more rules to be applied to information included in the group downlink control message for identifying the downlink resource configuration to be used for the retransmissions. In some examples of the method, apparatus, and non-transitory computer-readable medium described above, at least one rule includes evenly dividing a set of available resources within each BWP between one or more UEs that are to receive the retransmissions via the BWP. In some examples of the method, apparatus, and non-transitory computer-readable medium described above, at least one rule includes dividing a set of available resources within each BWP between one or more UEs that are to receive the retransmissions via the BWP, the dividing based at least in part on a number of resource blocks that may be associated with each UE. Some examples of the method, apparatus, and non-transitory computer-readable medium described above may further include processes, features, means, or instructions for selecting, from a preconfigured table of available downlink resource configurations for different BWPs, the downlink resource configuration based at least in part on a number of UEs that are to receive the retransmissions via each BWP.

In some examples of the method, apparatus, and non-transitory computer-readable medium described above, the downlink transmissions may be SPS messages, and a second plurality of SPS messages may be transmitted, after transmitting the retransmissions, and a second SPS message to the first UE may be transmitted via the first BWP. In some examples of the method, apparatus, and non-transitory computer-readable medium described above, the group downlink control message includes a group common physical downlink control channel (GC-PDCCH) message.

DETAILED DESCRIPTION

Figure 1:
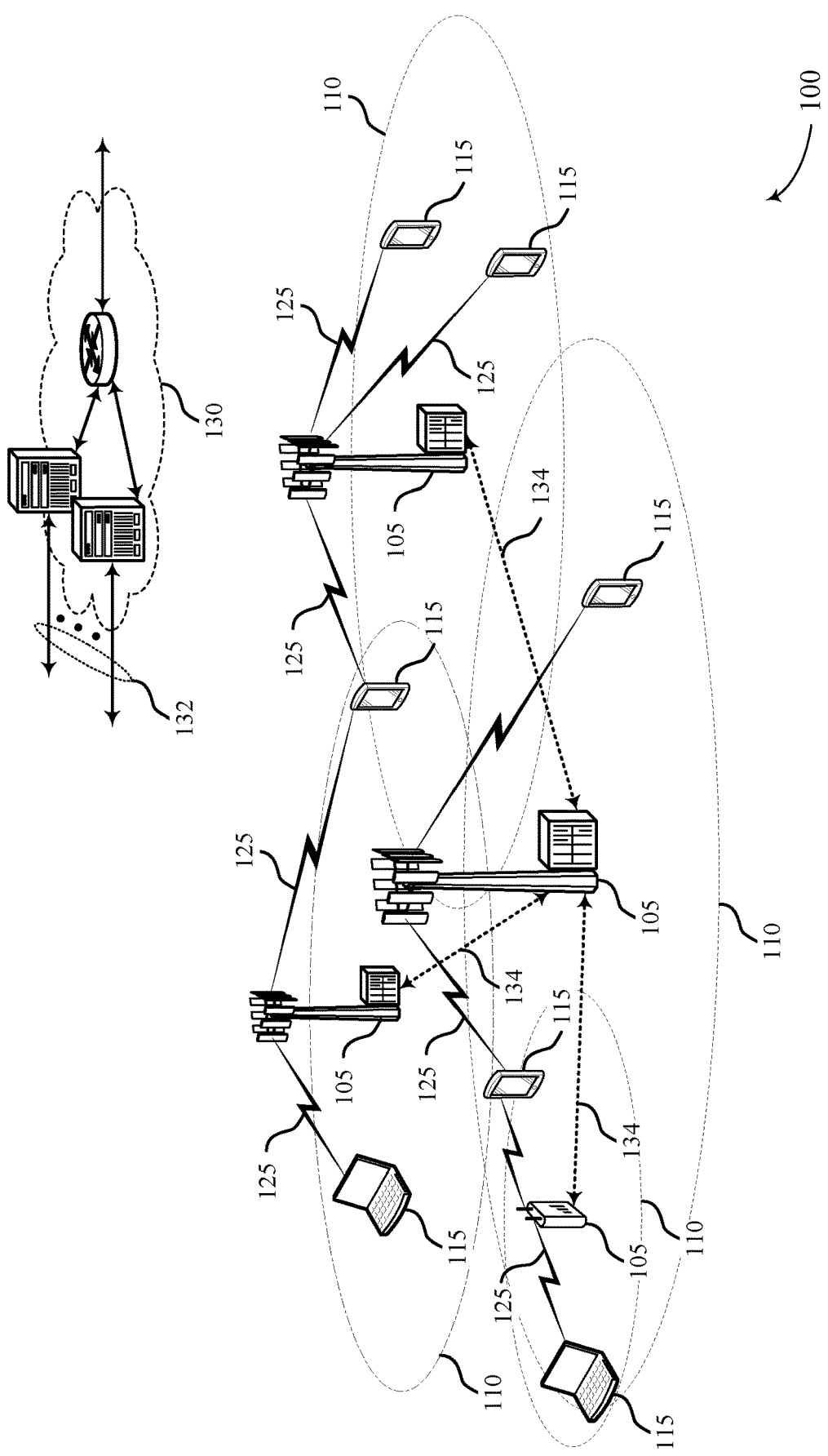
FIG. 1 illustrates an example of a system for wireless communication that supports group common control channel and bandwidth part management in wireless communications in accordance with aspects of the present disclosure.

In various aspects of the disclosure, wireless communications may use multiple bandwidth parts (BWPs) for communications that each use a portion of available transmission bandwidth for downlink and uplink transmissions. In such cases, a base station may allocate resources to a user equipment (UE,) that include wireless resources within a BWP. In cases where the base station transmits downlink transmissions to a number of UEs, such transmissions may include different downlink transmissions to the different UEs via the different BWPs. In cases where one or more of the UEs do not successfully receive their associated downlink transmission, a retransmission may be transmitted. For example, a UE may provide an acknowledgment/negative-acknowledgment (ACK/NACK) feedback message that may initiate a retransmission. Various techniques disclosed herein provide efficient techniques for indicating resources to be used for the retransmissions and for providing retransmissions that may be in a different BWP than the initial downlink transmissions.

Various aspects of the present disclosure provide for use of a group downlink control channel that indicates wireless resources for retransmissions. In some cases, a downlink control message may include information from which each UE transmitting a NACK message can determine its unique retransmission resource assignment within a BWP for the retransmission. The BWP and associated resources for a retransmission may be the same or different than a BWP and associated resources used for the initial downlink transmission. In some cases, a base station may transmit downlink transmissions to a set of UEs (e.g., URLLC communications using semi-persistent scheduling (SPS) protocols), and different BWPs may be used for downlink transmission to different UEs (e.g., using preconfigured SPS resources for each UE). The base station may receive NACK messages from a subset of the UEs and downlink retransmissions responsive to the NACK messages may be transmitted using the original BWP of the UEs or a different BWP. BWPs refer to bandwidth parts that are smaller than or equal to the number of carrier resource blocks on a radio frequency (RF) carrier between the base station and UEs, in any part of the carrier resource blocks.

In some cases, the base station may transmit a downlink control message that includes or otherwise provides an indication of a downlink resource configuration and BWP to be used for retransmission of the respective SPS messages. The base station may then retransmit the downlink transmissions to the subset of UEs using the identified BWPs according to the downlink resource configuration. In some cases, the downlink control message may indicate, for each BWP, a bitmap associated with each UE of the BWP and an indication of a number of UEs associated with the BWP for a retransmission, which may be different than an initial number of UEs associated with the BWP for the initial downlink transmissions. In some cases, the indication of the number of UEs may be an explicit indication of how many UEs are to use a BWP for a retransmissions. In other cases, the indication of the number of UEs may be an indication of how many UEs associated with any prior BWPs in an ordered set of BWPs are to receive a retransmission, and each UE may determine which BWP and associated resources are to be used for retransmissions.

In some examples, techniques provided herein may be used in wireless communications systems configured to support ultra-reliable/low-latency communications (URLLC). Such communications may be associated with stringent latency and reliability requirements and may be utilized in a variety of scenarios, such as emergency management communications, vehicle-based communications, factory automation communications, and the like. Some URLLC communications may be suitable for semi-persistent scheduling (SPS) protocols. For example, in factory automation deployments URLLC communications may be periodic in nature, may involve a rather consistent or small amount of data to be communicated, which may be suitable for SPS protocols. SPS protocols typically include preconfigured resources that are used for the URLLC communications, in which different subsets of UEs that are to receive URLLC communications may be configured in different BWPs to receive downlink SPS transmissions.

One issue that may arise in the above scenario is when SPS messages are not received and/or decoded by the receiving device (e.g., a UE). In this instance, the UE may transmit a negative acknowledge (NACK) message (e.g., as part of a hybrid acknowledgment repeat request (HARQ) procedure) to the base station indicating that the SPS message was not received and/or decoded. In response the base station may allocate new resources to retransmit the SPS message, e.g., resources outside of the preconfigured SPS resources, and transmit an indication of the resources in a new grant to the UE. In some cases, it may be desirable to use a different BWP for the retransmission than used for the initial downlink transmission, such as if multiple UEs in a first BWP transmit NACKs and no UEs of a different BWP transmit a NACK. According to some conventional protocols, retransmission resource grants may be provided on a per-UE basis. When there are many UEs, the control channel may be overwhelmed or, in some instances, may not have sufficient resources available to transmit all of the grant messages. This situation may be even further exacerbated in the situation where some or all of the UEs transmitting NACK messages have high aggregation levels. Accordingly, various aspects of the present disclosure provide for efficient use of available BWPs for retransmissions and downlink control messages that may indicate such resources to UEs, which may enhance efficiency of a wireless communications network.

Aspects of the disclosure are initially described in the context of a wireless communications system. Aspects of the present disclosure generally provide for a group downlink control message that provides an indication of retransmission resources within different BWPs to UEs within a subset of UEs in an SPS environment. For example, a base station may be performing SPS communications with the set of UEs. In some instances, the SPS communications may be URLLC communications, such as in a factory automation setting where the set of UEs is rather large (e.g., 100+ UEs). Aspects of the disclosure are further illustrated by and described with reference to apparatus diagrams, system diagrams, and flowcharts that relate to group common control channel and BWP management.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices. In some cases, base stations 105 and UEs 115 may use multiple BWPs for a set of downlink transmissions, in which one or more UEs 115 may use different BWPs for retransmissions of the downlink transmissions. In some cases, base stations 105 may use downlink control messages that provide an indication of wireless resources within a BWP that a UE 115 is to use for retransmissions of an initial transmission.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110. In some cases, geographic coverage areas 110 may be associated with a factory automation setting in which one or more UEs 115 may be associated with factory equipment (e.g., associated with a sensor/actuator (S/A) on a piece of equipment).

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device associated with a S/A, or the like, which may be implemented in various articles such as appliances, vehicles, meters, factory equipment, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions (e.g., BWPs) or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some cases, one or more of the base stations 105 may transmit SPS messages to a set of UEs 115 using respective resources corresponding to each UE 115. The base station 105 may receive, from each of a subset of UEs 115 from the set of UEs 115, feedback information (e.g., HARQ feedback) which may include one or more NACK messages associated with the SPS messages. Such a base station 105, in accordance with techniques provided herein, may transmit a group downlink control message including information associated with a downlink resource configuration and BWP for retransmission of the respective SPS messages to the subset of UEs 115. The base station 105 may retransmit SPS messages to each of the subset of UEs 115 using the downlink resource configuration via the associated BWP, which may be different than a BWP of the initial downlink transmission.

Similarly, one or more of the UEs 115 may transmit a NACK message associated with a SPS message that was unsuccessfully received via a first BWP. The UE 115 may receive, in response to the NACK message, a group downlink control message including information associated with a downlink resource configuration for retransmission of the SPS message to the UE 115 via a second BWP that is different than the first BWP. The UE 115 may identify the downlink resource configuration based at least in part on the group downlink control message. The UE 115 may receive a retransmission of the SPS message using the downlink resource configuration via the second BWP.

In one non-limiting example, the group downlink control message may contain a bitmap, where each bit corresponds to an individual UE 115 in the set of UEs and provides an indication of whether the UE 115 has transmitted a NACK message or an acknowledgment (ACK) message. In some aspects, the base station 105 and UEs 115 may be preconfigured (e.g., with a set of rules) to allow the UEs 115 to determine the downlink resource configuration for each BWP based on the bitmap either alone or in combination with one or more indications of a number of UEs 115 that are to receive retransmissions via a particular BWP. Accordingly, each UE 115 in the subset of UEs may be able to use the information associated with the downlink resource configuration indicated in the group downlink control message to identify its resources for the retransmission of their respective SPS message. The base station 105 may retransmit the SPS messages to each UE 115 in the subset of UEs using the respective downlink resource configuration. Thus, the described techniques provide for a single indication from the base station 105 of different retransmission resources for respective UEs 115 without requiring an individual grant message to each UE 115 in the subset of UEs.

Figure 2:
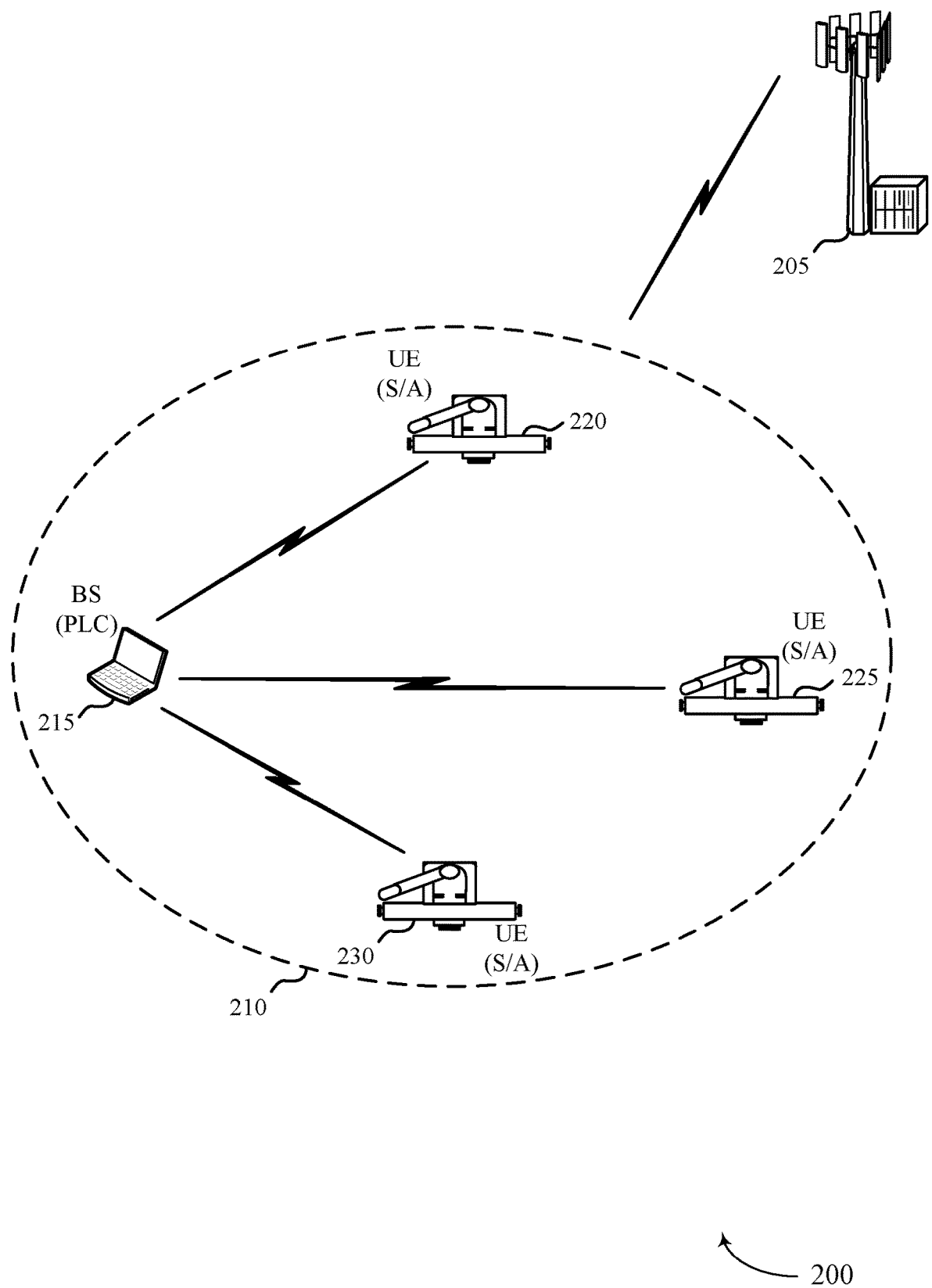
FIG. 2 illustrates an example of a portion of a wireless communication system that supports group common control channel and bandwidth part management in wireless communications in accordance with aspects of the present disclosure.

FIG. 2 illustrates an example of a portion of a wireless communication system 200 that supports group common control channel and bandwidth part management in wireless communications in accordance with various aspects of the present disclosure. In some examples, wireless communication system 200 may implement aspects of wireless communication system 100. Wireless communication system 200 may include a base stations 205 and 215, and UEs 220, 225, and 230, which may be examples of the corresponding devices described herein. Broadly, wireless communication system 200 illustrates one example of an environment where SPS protocols are for URLLC communications, such as in factory automation settings.

By way of example only, the UEs 220, 225, and 230 may be associated with sensor/actuator (S/A) of an associated piece of equipment in a particular zone 210, such as a zone within a factory automation setting. In some examples, the UEs 220, 225, 230 may perform wireless communications with each other and/or with base station 215 which may be an example of a programmable logic controller (PLC) in a factory automation setting. In some aspects, the wireless communications may be SPS based communications that support defined latency and/or reliability requirements. Thus, base station 215 may perform communications with one or more of UEs 220, 225, and/or 230. In some aspects, the SPS communications may be between one or more of the UEs. For example, some of the UEs (e.g., UEs 220, 225, 230) may be configured as S/As that perform various function within the factory automation setting, and base station 215 may be configured as a PLC that oversees and/or manages aspects of one or more S/As. Although three UEs are shown within zone 210, it is to be understood that more or fewer UEs may be utilized in accordance with aspects of the present disclosure. In one non-limiting example, a factory automation setting may include hundreds or even thousands of UEs within a zone 210. In some aspects, the UEs within the zone 210 may be considered a set of UEs that base station 215 is performing SPS communications with.

In some aspects, base station 215 (alone or in conjunction with base station 205) may configure the UEs within zone 210 for SPS communications. For example, base station 215 may use RRC signaling to provide an indication of the pre-configured SPS resources to be used for the SPS communications between one or more of the UEs and base station 215 and/or inter-communications between the UEs, and may configure such communications for different subsets of the UEs to be via different BWPs. Base station 215 may activate/deactivate the preconfigured SPS resources for one or more UEs for a particular subframe by including a trigger in the DCI of the subframe. For example, the base station 215 may transmit a DCI in a PDCCH control signal in each UE may attempt to decode the PDCCH by unscrambling a cyclic redundancy check (CRC) using a SPS cell radio network temporary identifier (SPS C-RNTI).

In some aspects, base station 215 may configure the UEs within zone 210 with rules to be applied to information included in a group downlink control message. The rules may allow the UEs in the zone 210 that have transmitted NACK messages responsive to an SPS message to identify a downlink resource configuration for a particular BWP to be used for retransmission of the SPS message. For example, the rules may be configured in RRC signaling, may be preconfigured (e.g., from a service provider), and the like. The rules may allow or otherwise provide a mechanism for each UE in the subset of UEs to identify from a group downlink control message unique resources for retransmission of their respective SPS messages via a particular BWP. In some aspects, the rules may generally provide an indication of how available retransmission resources within a BWP or among a number of BWPs are to be divided amongst the UEs in the subset of UEs period In some aspects, the rules may be associated with one or more preconfigured tables for a set of available downlink resource configurations that can be applied to the information included in the group downlink control message.

Accordingly, base station 215 may transmit SPS messages via configured BWPs to the set of UEs using respective resources corresponding to each UE, e.g., the resources that have been preconfigured for each UE in accordance with SPS protocols. In the example wireless communication system 200, this may include base station 215 transmitting respective SPS messages to each of UEs 220, 225, and 230. Some of the UEs in the set of UEs may receive the SPS messages and respond by transmitting ACK messages to base station 215. Other UEs, however, in the set of UEs may not receive the SPS messages and/or may not be able to decode the SPS messages and may therefore respond by transmitting NACK messages for their respective SPS messages. The UEs transmitting the NACK messages may be considered a subset of UEs.

Based on which UEs transmit NACK messages, base station 215 may determine wireless resources for retransmissions, which may include one or more retransmissions that are to be transmitted using a different BWP than the initial downlink transmission. The base station 215 may configure a group downlink control message to include or otherwise convey an indication of information associated with the downlink resource configuration. The downlink resource configuration may broadly refer to resources to be used for retransmission of the SPS messages to the respective UEs in the subset of UEs. The downlink resource configuration may provide an indication of retransmission resources that are unique to each UE in the subset of UEs that is to transmit via a particular BWP.

The UEs in the subset of UEs may receive the group downlink control message and use the information associated with the downlink resource configuration to identify which downlink resource configuration within a BWP will be used for retransmission of the UE's respective SPS message. For example, each UE may use the information associated with the downlink resource configuration in combination with one or more rules to identify or otherwise select the BWP for the retransmission and associated downlink resource configuration. In some aspects, the downlink resource configuration may include some, all, or none of the downlink resource configuration that was used for transmission of the original SPS message. In some aspects, the group downlink control message may be transmitted in a group common PDCCH (GC-PDCCH), or some other similar group control signal. The base station 215 may then retransmit the respective SPS messages to the UEs in the subset of UEs via the indicated BWP and according to each UEs corresponding downlink resource configuration. The UEs in the subset of UEs may know, based on the identified downlink resource configuration, which resources within the BWP are being used for their respective SPS message retransmission. In some aspects, the SPS messages may be retransmitted using the same, or a different MCS as the original SPS message transmission.

Thus, aspects of the present disclosure provide for, instead of sending separate individual PDCCH to each UE (e.g., S/A) in the subset of UEs, a group PDCCH is sent (e.g., the group downlink control message). Furthermore, a different BWP may be used for retransmission of one or more retransmissions than was used for an initial transmission. The group PDCCH may contain information from which each UE that is to receive a retransmission within a BWP can derive its retransmission resource assignment uniquely. In some examples, a single CRC may be attached to the group PDCCH (which may reduce the control overhead). In some aspects, even the group PDCCH payload itself may be significantly reduced as compared to separate PDCCHs for each UE in the subset of UEs. For instance, the group PDCCH may include a bitmap of UEs sending ACKs. This may be sufficient information, e.g., when each retransmission UE receives the same number of CCEs.

Figure 3:
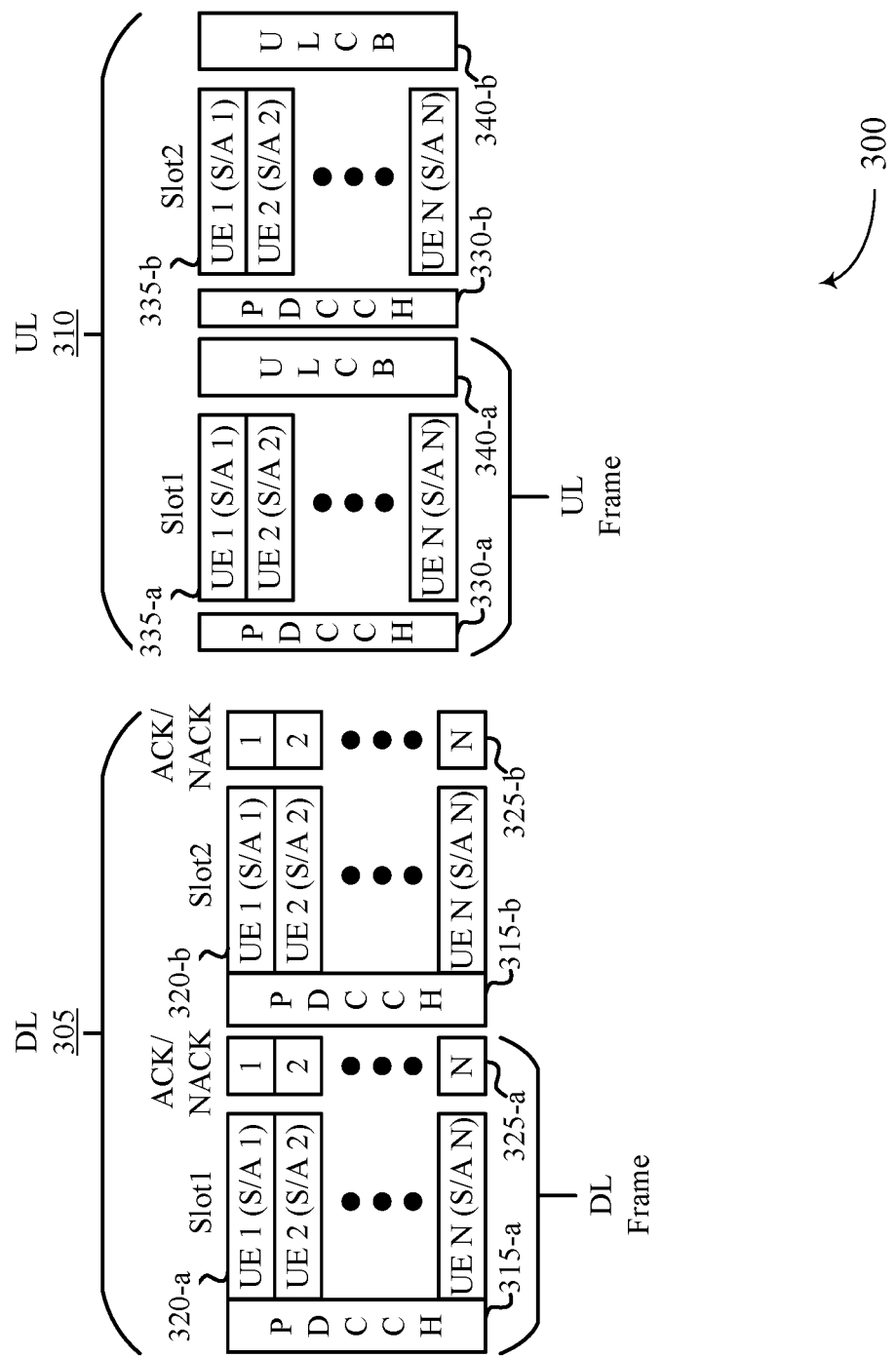
FIG. 3 illustrates an example of a frame structure that supports group common control channel and bandwidth part management in wireless communications in accordance with aspects of the present disclosure.

FIG. 3 illustrates an example of a frame structure 300 that supports group common control channel and bandwidth part management in wireless communications in accordance with various aspects of the present disclosure. In some examples, frame structure 300 may implement aspects of wireless communication system 100 or 200. Frame structure 300 illustrates an example of a downlink frame configuration 305 and uplink frame configuration 310. The downlink frame configuration 305 generally includes two self-contained downlink frames. Each self-contained downlink frame may include a control portion 315 (e.g., PDCCH control signal), a downlink resource configuration 320, and a corresponding ACK/NACK resource 325. The control portion 315 may carry or otherwise provide an indication of a downlink SPS trigger for UEs within a set of UEs. The SPS trigger may activate the downlink resource configuration 320 for the respective UEs in the set of UEs (e.g., UE 1 through UE N). As will be discussed in more detail below, in some cases the downlink resource configuration 320 may provide that different UEs receive the downlink transmissions in different BWPs. Thus, UE 1 may have a downlink resource configuration that includes time/frequency resources within a first BWP used for transmission of a downlink SPS message. UE 1 may respond to the SPS message by transmitting an ACK message or a NACK message, depending on whether UE 1 receives and/or decodes the SPS message, using the corresponding ACK/NACK resource 325. Other UEs may have time/frequency resources within different BWPs. Generally, the same procedure is repeated for the second self-contained downlink frame (e.g., slot 2), although some differences may include the use of a group common control message identifying resources to be used for retransmission of the SPS messages to UEs that transmitted NACK messages, as described below.

Uplink frame configuration 310 in this example includes two self-contained uplink frames. Each self-contained uplink frame may include a control portion 330 (e.g., PDCCH control signal), an uplink resource configuration 335 in which different UEs may be allocated resources in different BWPs, and an uplink control block (ULCB) 340. Generally, the control portion 330 may carry or otherwise provide an indication of an uplink SPS trigger for UEs within a set of UEs. The uplink SPS trigger may activate the uplink resource configuration 335 for the respective UEs in the set of UEs (e.g., UE 1 through UE N). Thus, UE 1 may have an uplink resource configuration that includes time/frequency resources within the first BWP used for transmission of an uplink SPS message. UE 1 may receive a response to the uplink SPS message via an ACK message or a NACK message, depending on whether the base station receives and/or decodes the uplink SPS message, using the control portion 330 in the next self-contained uplink frame. ULCB 340 may provide various uplink control signals, parameters, etc., and, in some examples, may include one or more guard periods to allow for transmission from uplink-to-downlink at one or more of the wireless devices. Generally, the same procedure is repeated for the second self-contained downlink frame (e.g., slot 2).

In some examples, one for more of the uplink SPS messages and/or downlink SPS messages may not be received and/or decoded by the respective receiving device. Accordingly, frame structure 300 may utilize aspects of the described techniques to provide a group downlink control message to convey an indication of retransmission resources. In a downlink example, the control portion 315 may carry a group downlink control message that includes information associated with a downlink resource configuration 320 for retransmission of respective SPS messages to a subset of UEs. For example, during the first self-contained downlink frame the SPS messages transmitted during slot 1 may be received by some UEs, but not by all of the UEs. Accordingly, those UEs may respond by transmitting a NACK message and the corresponding ACK/NACK resource 325-a to the base station. The UEs transmitting the NACK messages may form a subset of UEs. The base station may respond by transmitting a group downlink control message and the control portion 315-b of the second self-contained downlink frame. The group downlink control message may include information associated with downlink resource configuration 320-b for retransmission of the respective SPS messages to the subset of UEs. The UEs in the subset of UEs may identify their respective downlink resource configuration 320-b based on the information included in the group downlink control message, e.g., access to a lookup table or other reconfiguration rule that ties the information included in the group downlink control message with the corresponding downlink resource configuration 320-b. In some cases, a retransmission may be transmitted to a UE using a different BWP than the initial downlink transmission, and the downlink control message may provide information that may be used to determine the downlink resource configuration 320-b within each BWP. Accordingly, the base station may retransmit the SPS messages to each UE in the subset of UEs using the downlink resource configuration 320-b, which may include retransmitting one or more SPS messages via a different BWP than used in downlink resource configuration 320-a.

Figure 4:
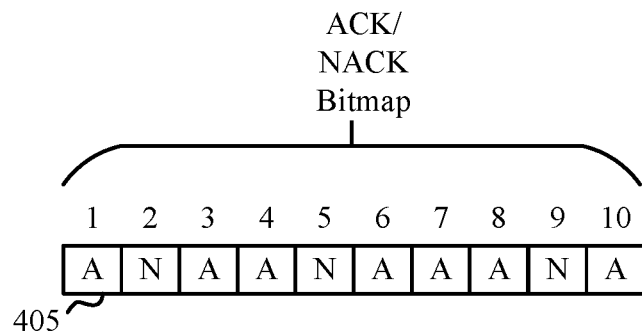
FIG. 4 illustrates an example of retransmission resources that support group common control channel and bandwidth part management in wireless communications in accordance with aspects of the present disclosure.
Figure 4:
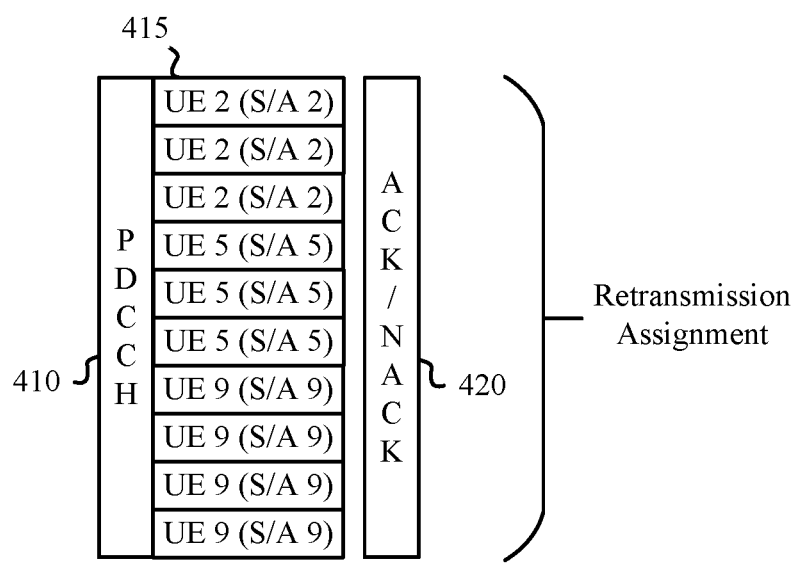

FIG. 4 illustrates an example of retransmission resources 400 that supports group common control channel and bandwidth part management in wireless communications in accordance with various aspects of the present disclosure. In some examples, retransmission resources 400 may implement aspects of wireless communication system 100 or 200.

In this example, retransmission resources 400 have an ACK/NACK bitmap that may be indicated in a group downlink control message. For example, a base station may transmit SPS messages to (or receive SPS messages from) a set of UEs using respective resources corresponding to each UE. In a downlink situation, the base station may receive individual ACK messages or NACK messages from the UEs in the set of UEs responsive to the SPS messages. In an uplink situation, the base station may provide an indication of ACK/NACK to the set of UEs. An ACK message provides an indication that a UE (in the downlink scenario) or the base station (in an uplink scenario) received and successfully decoded its SPS message. Correspondingly, a NACK message provides an indication that the SPS message was not received and/or was not able to be successfully decoded. The base station may respond by transmitting a group downlink control messages to the UEs in the set of UEs. In one example, the group downlink control message may include information associated with downlink resource configuration for retransmission of the respective SPS messages. For example, the base station may transmit the ACK/NACK bitmap of retransmission resource 400 that provides the indication of the information associated with the downlink resource configurations.

In some aspects, the ACK/NACK bitmap includes a plurality of bits 405, where each bit 405 corresponds to a particular UE in the set of UEs. Thus, the first bit may correspond to UE 1, the second bit may correspond to UE 2, and so forth. Generally, the presence or absence of a bit for the respective UE may be based on whether the base station received an ACK message or a NACK message from that UE (in the downlink scenario) or of whether the base station was able to receive and decode the SPS messages received from UEs (in an uplink scenario). Thus, in the example ACK/NACK bitmap indicates that the base station received ACK messages from UEs 1, 3, 4, 6-8, and 10 and received NACK messages from UEs 2, 4, and 9 (in a downlink scenario) or that the base station is providing an ACK indication to UEs 1, 3, 4, 6-8, and 10 and providing a NACK indication to UEs 2, 4, and 9 (in an uplink scenario).

In some aspects, the base station and UEs in the set of UEs may be configured with one or more sets of rules to be applied to the information included in the group downlink control message (e.g., to the ACK/NACK bitmap) in determining the downlink resource configuration to be used for retransmission of the SPS messages. Generally, the rules may provide an indication of how available resources (including resources that corresponded to SPS messages for which ACK messages were received) may be divided among the UEs in the subset of UEs, e.g., evenly divided, based on the resource block count for each UE in the subset of UEs, etc. In some examples, different UEs may be associated with different BWPs (e.g., UEs 1-3 may be associated with a first BWP, UEs 4-6 may be associated with a second BWP, and UEs 7-10 may be associated with a third BWP), and the group downlink control message may include information on how resources within each BWP are allocated for retransmissions. In one example, this may include a set of available downlink resource configurations to be applied to the information included in the group downlink control message. In some aspects, this may include one or more preconfigured tables that can be used with the information included in the group downlink control message to determine the downlink resource configuration.

Thus, FIG. 4 also illustrates an example of a retransmission assignment (e.g., the downlink resource configuration) to be used for retransmission of the SPS messages. In the example FIG. 4, the SPS message transmission and retransmission are illustrated as downlink SPS messages/retransmissions. Thus, the base station may provide the ACK/NACK bitmap in the control portion 410 (e.g., a PDCCH control signal, such as a GC-PDCCH). The UEs in the subset of UEs (e.g., UEs 2, 4, and 9) may receive the group downlink control message and use the indicated information (e.g., the ACK/NACK bitmap and BWP-related information) along with the one or more rules to identify the downlink resource configuration to use for retransmission of the respective SPS messages. In the example of FIG. 4, this may include downlink resources 415 in which resources 1-3 are allocated to UE2, resources 4-6 are allocated to UE 5, and resources 7-10 are allocated to UE 9. Thus, UEs 2, 4, and 9 may use the identified downlink resource configurations to receive retransmissions of the SPS messages from the base station. The retransmission assignment may also include uplink ACK/NACK resources 420, as is described with reference to FIG. 3. While this example provides that one UE within each BWP receives retransmissions, in other examples different numbers of UEs within each BWP may receive retransmissions, and it may be beneficial to change a BWP of one or more UEs in order to provide balanced use of resources for retransmissions.

Figure 5:
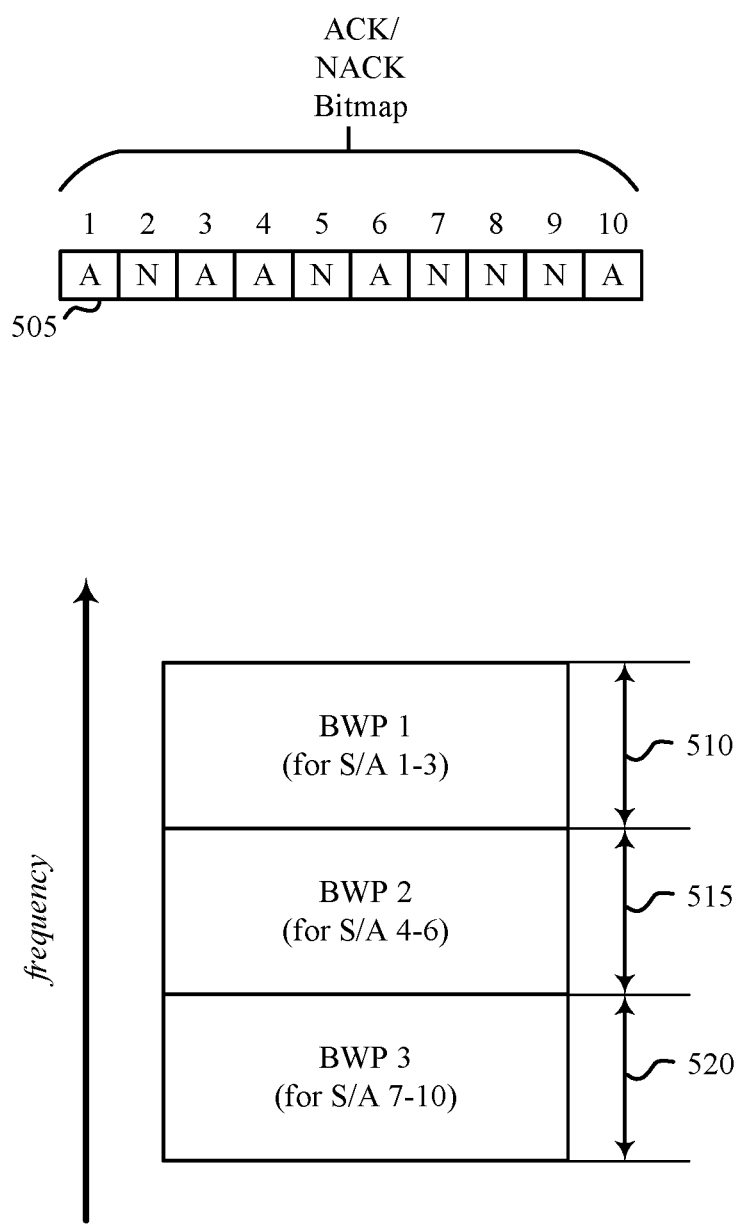
FIG. 5 illustrates an example of BWPs and initial resources for UEs that supports group common control channel and bandwidth part management in wireless communications in accordance with aspects of the present disclosure.

FIG. 5 illustrates an example of BWPs and initial resources for UEs 500 that supports group common control channel and bandwidth part management in wireless communications in accordance with various aspects of the present disclosure. In some examples, BWPs and initial resources for UEs 500 may implement aspects of wireless communication system 100 or 200. As discussed above, in some cases different UEs may be scheduled for transmissions using different BWPs (e.g., different UEs may be configured for SPS transmissions in different BWPs of a transmission bandwidth).

In the example of FIG. 5, a first BWP 510 may be configured for transmissions for different UEs, such as S/As 1-3 in this example. Likewise, a second BWP 515 may be configured for transmission of S/As 4-6, and a third BWP 520 may be configured for S/As 7-10. While such a configuration may provide efficient and balanced use of wireless resources for initial transmissions, such as for initial SPS transmissions to a set of UEs that are configured as S/As 1-10, retransmissions to a subset of the S/As may result in different numbers of retransmissions per BWP if a same BWP is used for initial transmissions and retransmissions. For example, as indicated in ACK/NACK bitmap, each bit 505 may represent an ACK/NACK for each S/A, and in this example, S/As 2,5, and 7-9 have each indicated NACK and thus a retransmission may be transmitted to each of these S/As. In this case, S/A 2 is associated with the first BWP 510, S/A 5 is associated with the second BWP 515, and S/As 7-9 are associated with the third BWP 520. If the same BWP were to be used for both the initial transmissions and retransmissions, then each of the first BWP 510 and the second BWP 515 would carry only a single retransmission while the third BWP 520 would carry three retransmissions. Thus, techniques such as provided herein may allow a base station to have flexibility for allocating resources for retransmissions, which may help to balance the use of resources and enhance the efficiency of the wireless communication system.

Thus, in some cases, a UE in a BWP that has higher retransmission needs can be temporarily reassigned to another BWP (e.g., S/A 7 may be reassigned to the first BWP 510 or the second BWP 515). Such a reassignment of BWP may be indicated, for example, through BWP-change DCI that is transmitted sufficiently in advance of the UE's retransmission slot to allow for switching time at the UE. Indication of resources assignments within each BWP may be provided in a downlink control message, which in some cases may be a group common PDCCH transmission.

Figure 6:
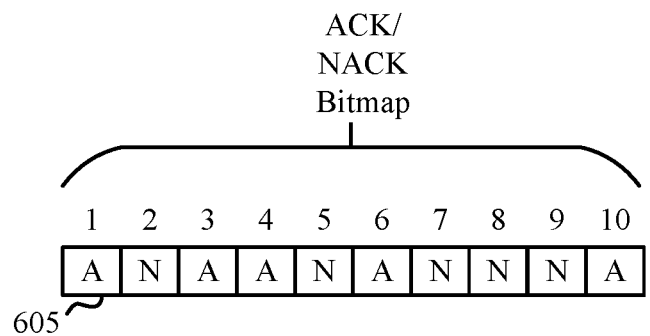
FIG. 6 illustrates an example of retransmission resources with changed BWPs for a UE that supports group common control channel and bandwidth part management in wireless communications in accordance with aspects of the present disclosure.
Figure 6:
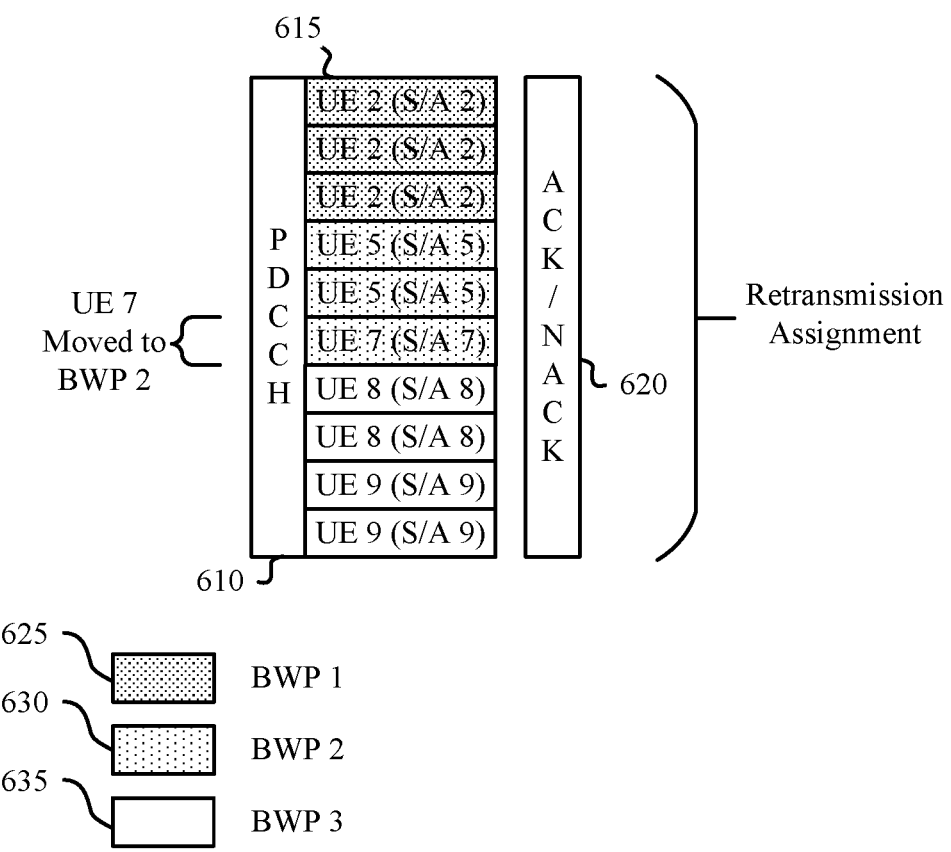

FIG. 6 illustrates an example of retransmission resources with changed BWPs 600 that support group common control channel and bandwidth part management in wireless communications in accordance with various aspects of the present disclosure. In some examples, retransmission resources with changed BWPs 600 may implement aspects of wireless communication system 100.

In this example, an ACK/NACK bitmap may be indicated in a group downlink control message and may include a number of bits 605 each associated with an ACK or NACK for each UE configured for transmissions. For example, a base station may transmit SPS messages to (or receive SPS messages from) a set of UEs using respective resources corresponding to each UE, in which two or more BWPs may be used for transmission to different subsets of UEs. In a downlink situation, the base station may receive individual ACK messages or NACK messages from the UEs in the set of UEs responsive to the SPS messages. The base station may respond by transmitting a group downlink control messages in control portion 610 to the UEs in the set of UEs. In one example, the group downlink control message may include information associated with downlink resource configuration for retransmission of the respective SPS messages, in which one or more UEs may be temporarily reassigned to a different BWP for the retransmission.

Continuing with the example as discussed in FIG. 5, for initial transmissions UEs 1-3 may be associated with a first BWP 625, UEs 4-6 may be associated with a second BWP 630, and UEs 7-10 may be associated with a third BWP 635. In the example ACK/NACK bitmap indicates that the base station received ACK messages from UEs 1, 3, 4, 6, and 10 and received NACK messages from UEs 2, 5, and 7-9, and thus that downlink resources 615 include resources for retransmissions to UEs 2, 5, and 7-9. As indicated above, if the same BWPs were to be used for transmissions and retransmissions, such a scenario would result in the third BWP 635 carrying retransmissions for three UEs, while the other BWPs would each carry retransmissions for just one UE. Thus, in this example, UE 7 may be moved from the third BWP 635 to the second BWP 630 for the retransmission. Following the retransmission, UE 7 may move back to the third BWP 635 (e.g., to receive a subsequent SPS transmission in accordance with the configured SPS resources).

Similarly as discussed above, in some cases the base station and UEs may be configured with one or more sets of rules to be applied to the information included in the group downlink control message (e.g., to the ACK/NACK bitmap) in determining the downlink resource configuration to be used for retransmission of the SPS messages. The UEs in the subset of UEs (e.g., UEs 2,5, and 7-9) may receive the group downlink control message and use the indicated information (e.g., the ACK/NACK bitmap and BWP-related information) along with the one or more rules to identify the downlink resource configuration to use for retransmission of the respective SPS messages within the associated BWP. In the example of FIG. 6, this may include downlink resources 615 in which resources 1-3 are allocated to UE 2, resources 4 and 5 are allocated to UE 5, resource 6 is allocated to UE 7, resources 7-8 are allocated to UE 8, and resources 9-10 are allocated to UE 9. The retransmission assignment may also include uplink ACK/NACK resources 620, as is described with reference to FIG. 3.

In some cases, the group PDCCH in control portion 610 may include explicit resource allocation for each UE within its respective BWP (which may be indicated without the use of the bitmap), and the moved UE 7 in this example may have its resources indicated explicitly. In other cases, where the ACK/NACK bitmap is utilized for implicit resource indication, then for dynamic grouping in which different UEs may be associated with different BWPs for retransmissions, additional information may also be provided that may be used to determine resources within each BWP. Such additional information may include, for example, one or more of an indication of a group length to indicate to each UE the ACK/NACK bitmap length for a particular BWP, or updated group ACK/NACK bitmap for the associated BWP. In some cases, an index of the moved UE for an updated ACK/NACK bitmap, which may be mapped to retransmission resources, may be included in its BWP-change DCI. In some cases, temporarily reassigned UEs may have an index that maps to resources located toward the end of the resources of a BWP in order to minimize impact for existing group members of the BWP. In some cases, for the BWP from which the UE is moved (e.g., the third BWP 635 in this example), the control message in the control portion 610 may either maintain the same group length and change the NACK bit associated with the of the moved UE to ACK to indicate to the remaining UEs that the resources are divided according to the rules provided for the remaining number of UEs, or indicate an updated group length and updated ACK/NACK bitmap, together with the index of the moved UE. Examples of such control message indications are discussed below with respect to FIG. 7.

Figure 7:
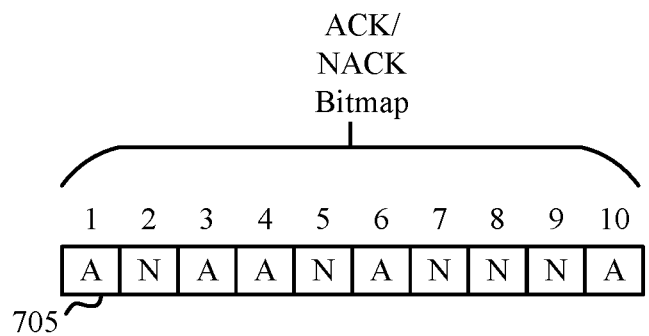
FIG. 7 illustrates an example of BWP resources and associated control information that supports group common control channel and bandwidth part management in wireless communications in accordance with aspects of the present disclosure.
Figure 7:
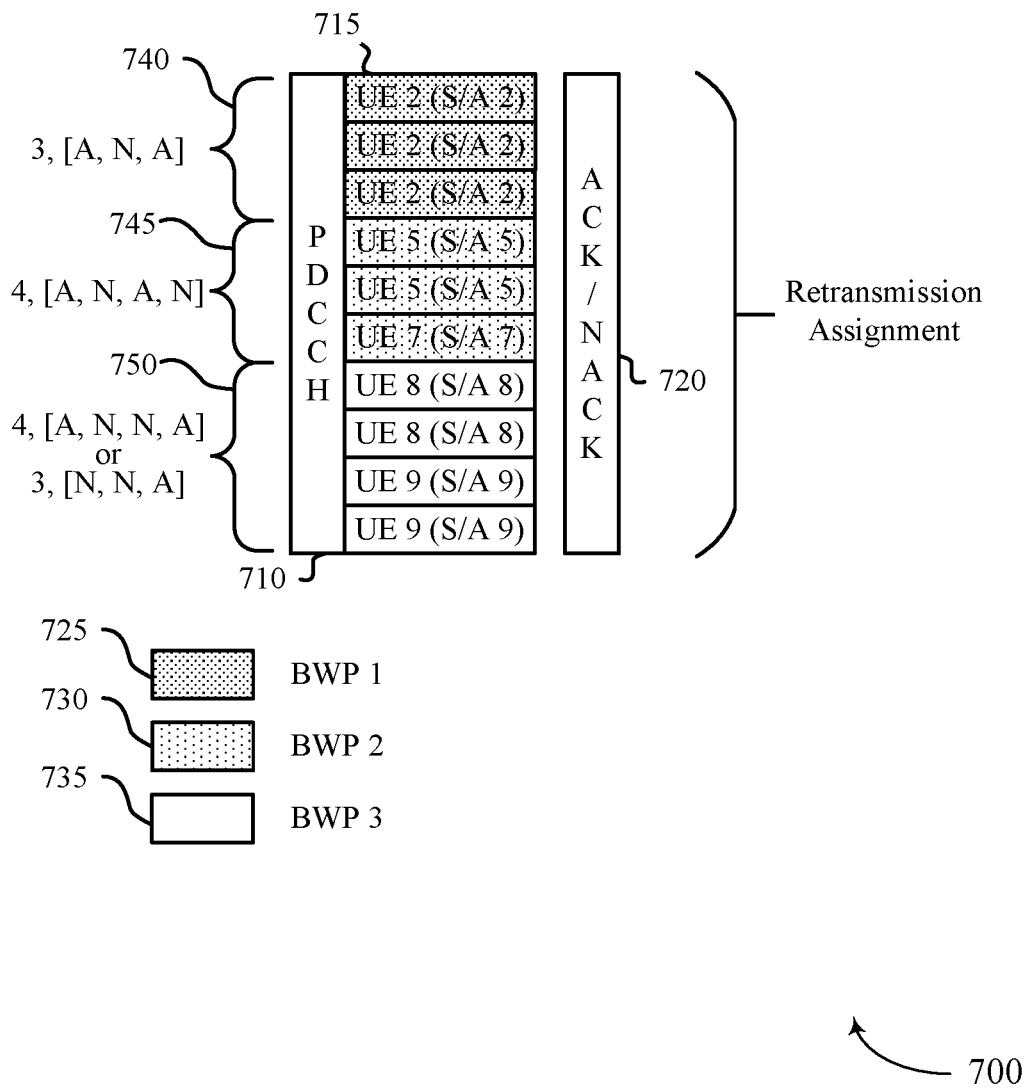

FIG. 7 illustrates an example of BWP resources and associated control information 700 that supports group common control channel and bandwidth part management in wireless communications in accordance with various aspects of the present disclosure. In some examples, BWP resources and associated control information 700 may implement aspects of wireless communication system 100.

In this example, which continues with the example of FIG. 6, an ACK/NACK bitmap may be indicated in a group downlink control message and may include a number of bits 705 each associated with an ACK or NACK for each UE configured for transmissions. As discussed above, for initial transmissions UEs 1-3 may be associated with a first BWP 725, UEs 4-6 may be associated with a second BWP 730, and UEs 7-10 may be associated with a third BWP 735. In the example ACK/NACK bitmap, which may be transmitted in downlink portion 710, indicates that the base station received ACK messages from UEs 1,3, 4,7, and 10 and received NACK messages from UEs 2,5, and 7-9, and thus that downlink resources 715 include resources for retransmissions to UEs 2,5, and 7-9. As indicated above, UE 7 may be moved from the third BWP 735 to the second BWP 730 for the retransmission in this example. Following the retransmission, UE 7 may move back to the third BWP 735 (e.g., to receive a subsequent SPS transmission in accordance with the configured SPS resources). The retransmission assignment may also include uplink ACK/NACK resources 720, as is described with reference to FIG. 3.

In this example, the downlink control message may include, for each BWP, associated control information. In this example, the first BWP 725 may include first control information 740. The control information and associated downlink retransmissions may be transmitted in the same BWP. Likewise, the second BWP 730 may include second control information 745 and the third BWP 735 may include third control information 750. As before, each UE with a retransmission in an updated BWP grouping may derive its resource allocation from the control message (e.g., based on an index of the UE and one or more rules such as discussed above which may divide resources within the BWP between UEs that are to receive retransmissions). In this example, the first BWP 725 may be used for retransmission to UE 2, and the first control information 740 may include a length indication of three and the corresponding portion of the ACK/NACK bitmap may indicate to UE 2 that no other UEs are to receive retransmissions via the first BWP 725, and thus UE 2 may determine that all of the resources of the first BWP are allocated to its retransmission.

In this example, the second BWP 730 may be used for retransmissions of UE 5 and UE 7, in which UE 7 is moved from the third BWP 735 for the retransmission. Thus, in this example, the second control information 745 may be updated to indicate a new length of four, and the corresponding portion of the ACK/NACK bitmap may indicate that UE 5 and UE 7 are to receive retransmissions via the second BWP 730. In such a case, UE 5 and UE 7 may determine their associated resources within the second BWP 730 in accordance with the rules for resource allocation (e.g., even division of available resources between UEs, a priority order for allocating any uneven resources, etc.). For the third BWP 735, the associated third control information may be updated, in one option, to switch the NACK associated with the moved UE to an ACK while keeping the prior length of the associated portion of the ACK/NACK bitmap the same; or in another option, to update the length of the associated ACK/NACK bitmap to indicate ACK/NACK without the moved UE. The remaining UEs in the third BWP 735 may then determine their associated resources in accordance with the rules for resource allocation as discussed above.

Figure 8:
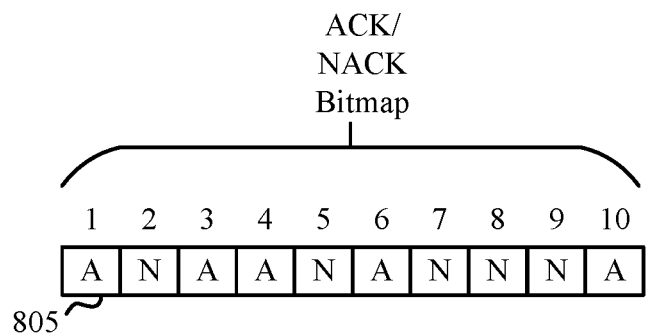
FIG. 8 illustrates another example of BWP resources and associated control information that supports group common control channel and bandwidth part management in wireless communications in accordance with aspects of the present disclosure.
Figure 8:
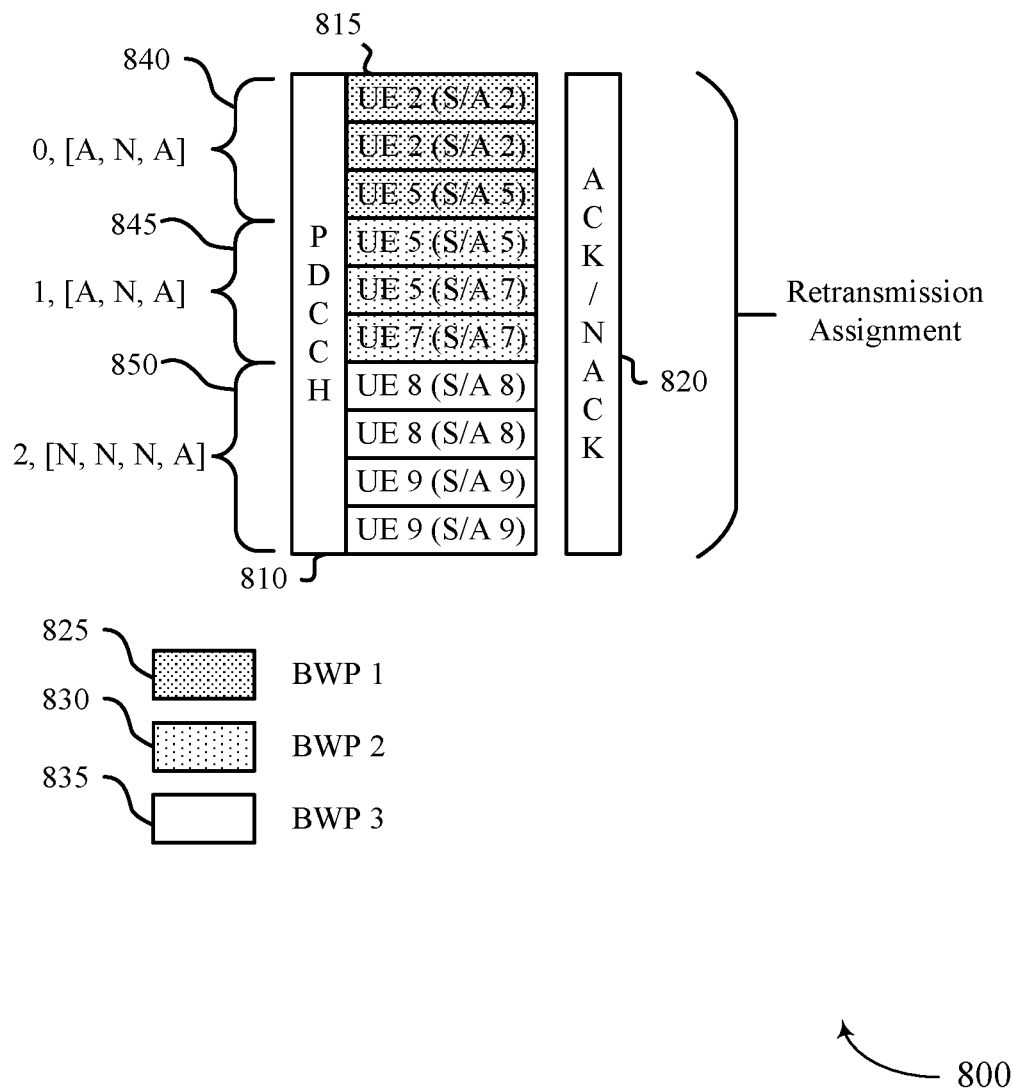

FIG. 8 illustrates another example of BWP resources and associated control information 800 that supports group common control channel and bandwidth part management in wireless communications in accordance with various aspects of the present disclosure. In some examples, BWP resources and associated control information 800 may implement aspects of wireless communication system 100. In this example, information may be provided for each BWP that indicates how many UEs in any prior BWPs have retransmissions, and the receiving UEs may use the information, in conjunction with the ACK/NACK bitmap to determine which BWP is to be used for the retransmission and allocated resources within the BWP.

In this example, which continues with the example of FIG. 6, an ACK/NACK bitmap may be indicated in a group downlink control message and may include a number of bits 805 each associated with an ACK or NACK for each UE configured for transmissions. As discussed above, for initial transmissions UEs 1-3 may be associated with a first BWP 825, UEs 4-6 may be associated with a second BWP 830, and UEs 7-10 may be associated with a third BWP 835. In the example ACK/NACK bitmap, which may be transmitted in downlink portion 810, indicates that the base station received ACK messages from UEs 1, 3, 4, 7, and 10 and received NACK messages from UEs 2, 5, and 7-9, and thus that downlink resources 815 include resources for retransmissions to UEs 2, 5, and 7-9. As indicated above, UE 7 may be moved from the third BWP 835 to the second BWP 830 for the retransmission in this example. Following the retransmission, UE 7 may move back to the third BWP 835 (e.g., to receive a subsequent SPS transmission in accordance with the configured SPS resources). The retransmission assignment may also include uplink ACK/NACK resources 820, as is described with reference to FIG. 3.

In this example, the downlink control message may include, for each BWP, associated control information that may indicate an aggregate number of UEs of any prior BWPs of an ordered set to BWPs that are to receive retransmissions. In this example, the first BWP 825 may include first control information 840. Likewise, the second BWP 830 may include second control information 845 and the third BWP 835 may include third control information 850. As before, each UE with a retransmission in an updated BWP grouping may derive its resource allocation from the control message (e.g., based on an index of the UE and one or more rules such as discussed above which may divide resources within the BWP between UEs that are to receive retransmissions).

In this example, the first BWP 825 may be a first BWP in the ordered set of BWPs and may be used for retransmission to UE 2. The first control information 840 may include an indication that no UEs are to receive retransmissions in a prior BWP. Thus, UE 2 may determine based on the aggregate number of UEs with retransmissions from prior BWPs that its retransmission will be via the first BWP and that no switch of BWPs is to be performed. UE 2 may then determine its associated resources within the first BWP 825 based on rules for resources allocation, which in some cases may be based on the total number of UEs that have retransmissions that may be indicated in ACK/NACK bitmap. In the example of FIG. 8, resources may be divided equally across the entire bandwidth for the number of UEs that are to receive retransmissions. In some cases, the rules may have other constraints, such as how to divide uneven resources, how to allocate resources in the case where resources span across BWPs (e.g., no spanning of BWPs is allowed and a UE that spans BWPs may be moved to a higher BWP or a BWP with the fewest UEs).

In this example, the second BWP 830 may have associated second control information 845 with an indication that one UE is to receive retransmission in a prior BWP (e.g., the first BWP 825 in this example. Thus, UE 5 may determine based on the aggregate number of UEs with retransmissions from prior BWPs that its retransmission will be via either the first BWP 825 or the second BWP 830, depending upon the spanning rules, based on the determination of its associated resources (e.g., based on the total number of UEs that have retransmissions that may be indicated in ACK/NACK bitmap and equal division of resources across all BWPs). In some examples, the rules may provide that UE 5 is to use resources only within the second BWP 830 (e.g., based on equally divided resources spanning BWPs and a rule to select a higher BWP in such cases), and thus UE 5 may determine that BWP switching is not needed and may determine resources within the second BWP 830 for retransmissions. Further, the third BWP 835 may have associated third control information 850 that may indicate that two UEs of prior BWPs are to receive retransmissions. Based on such an indication and the ACK/NACK bitmap, in this case, UE 7 may determine that it is to switch to the second BWP 830 for its retransmission, and may determine resources within the second BWP 830 based on the resource allocation rules. Likewise, UE 8 and UE 9 may determine that BWP switching is not needed and may identify retransmission resources within the third BWP 835 in accordance with the resource allocation rules where two UEs are to receive retransmissions within the third BWP 835. In some cases, the group PDCCH may be transmitted sufficiently in advance of the downlink resources 815 to allow for BWP switch time.

Thus, in such cases, an additional BWP-switch DCI may not need to be transmitted for UE 7.

Figure 9:
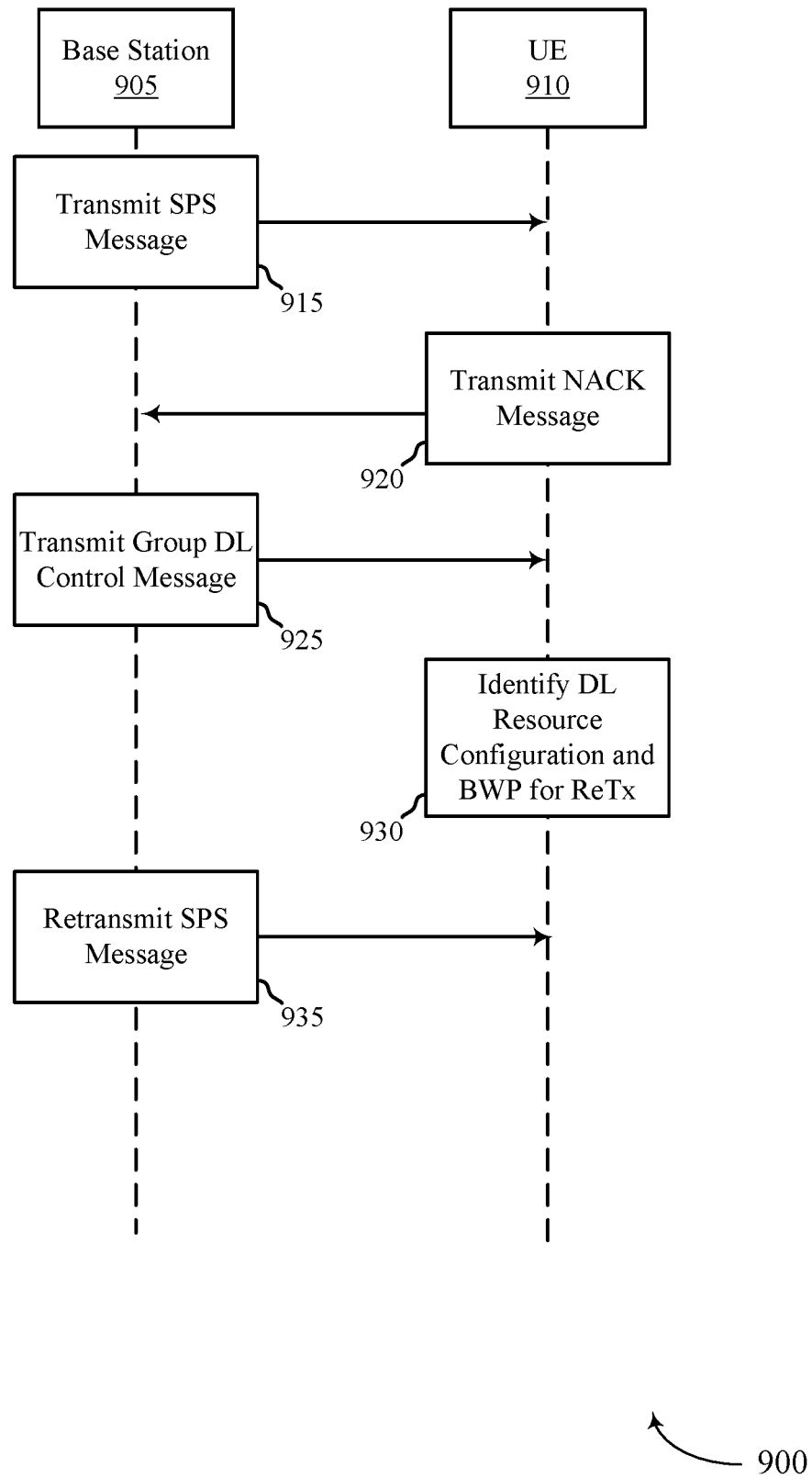
FIG. 9 illustrates an example of a process flow that supports group common control channel and bandwidth part management in wireless communications in accordance with aspects of the present disclosure.

FIG. 9 illustrates an example of a process flow 900 that supports group common control channel and bandwidth part management in wireless communications in accordance with various aspects of the present disclosure. In some examples, process flow 900 may implement aspects of wireless communication system 100 or 200. Process flow 900 may include a base station 905 and a UE 910, which may be examples of corresponding devices described herein.

At 915, base station 905 may transmit (and UE 910 may receive) SPS messages to a set of UEs using respective resources corresponding to each UE. UE 910 may be a UE in the set of UEs. The SPS messages may be transmitted to the set of UEs via two or more BWPs, and UE 910 may receive its SPS transmissions via a first BWP in accordance with its SPS configuration.

At 920, UE 910 may determine that its SPS message has not been successfully received and decoded, and may transmit (and base station 905 may receive) a NACK message associated with the respective SPS messages. The NACK message may be received at the base station 905 from UE 910 and one or more other UEs in a subset of UEs. In some cases, one or more of the other UEs may be associated with a different BWP than UE 910. In some cases, two or more UEs associated with the first BWP may transmit NACKs, and the base station 905 may determine that at least one of such UEs is to be switched to a different BWP for a retransmission of its SPS message.

At 925, base station 905 may transmit (and UE 910 may receive) a group downlink control message including information associated with the downlink resource configuration for retransmission of the respective SPS messages to the subset of UEs. In some aspects, base station 905 may configure the group downlink control message to indicate a number resource blocks that are associated with each UE in the subset of UEs. In some aspects, the information associated with that downlink resource configuration may include one or more of a bitmap corresponding to which UEs in the set of UEs that NACK messages were received from and which UEs in the set of UEs ACK messages were received from. In some aspects, the group downlink control message may include a GC-PDCCH message. In some cases, the group downlink control message may include information that may indicate how many UE are to receive retransmission within a BWP, which may be used by the UEs to determine corresponding resources within the BWP. In some cases, such information may include a group length indicator that may be used in conjunction with a corresponding portion of the bitmap associated with the BWP to determine resources for each UE within the BWP.

At 930, UE 910 may identify the downlink resource configuration within its BWP based at least in part on the group downlink control message. In some aspects, a base station 905 may transmit (and UE 910 may receive) an indication of one or more rules to be applied to the information included in the group downlink control message. In such cases, such rules may be signaled via RRC signaling in conjunction with SPS configuration for the UEs. UE 910 may use this information in determining the downlink resource configuration within its BWP to be used for retransmission of the SPS message. An example of one rule may include evenly dividing a set of available resources within a BWP between the UEs that are to receive retransmissions via the BWP. Another example of one rule may include dividing a set of available resources between the UEs in the subset of UEs based at least in part on a number resource blocks that are associated with each UE in the subset of UEs.

In some cases, each UE may have an associated index value within the BWP, and the set of available resources for each UE may be mapped to the associated index value. In some aspects, base station 905 may transmit (and UE 910 may receive) an indication of a set of available downlink resource configurations to be applied to the information included in the group downlink control message and determining the downlink resource configuration to be used for retransmission of the SPS message. For example, this may include selecting from a preconfigured table a set of available resource configurations based on the index value.

At 935, base station 905 may transmit (and UE 910 may receive) a retransmission of the SPS messages via corresponding BWPs using the downlink resource configuration associated with each BWP. In some cases, one or more UEs may be switched to different BWPs for the retransmission, and UEs within each BWP may determine retransmission resources based on the number of UEs that are retransmitting in the associated BWP.

Figure 10:
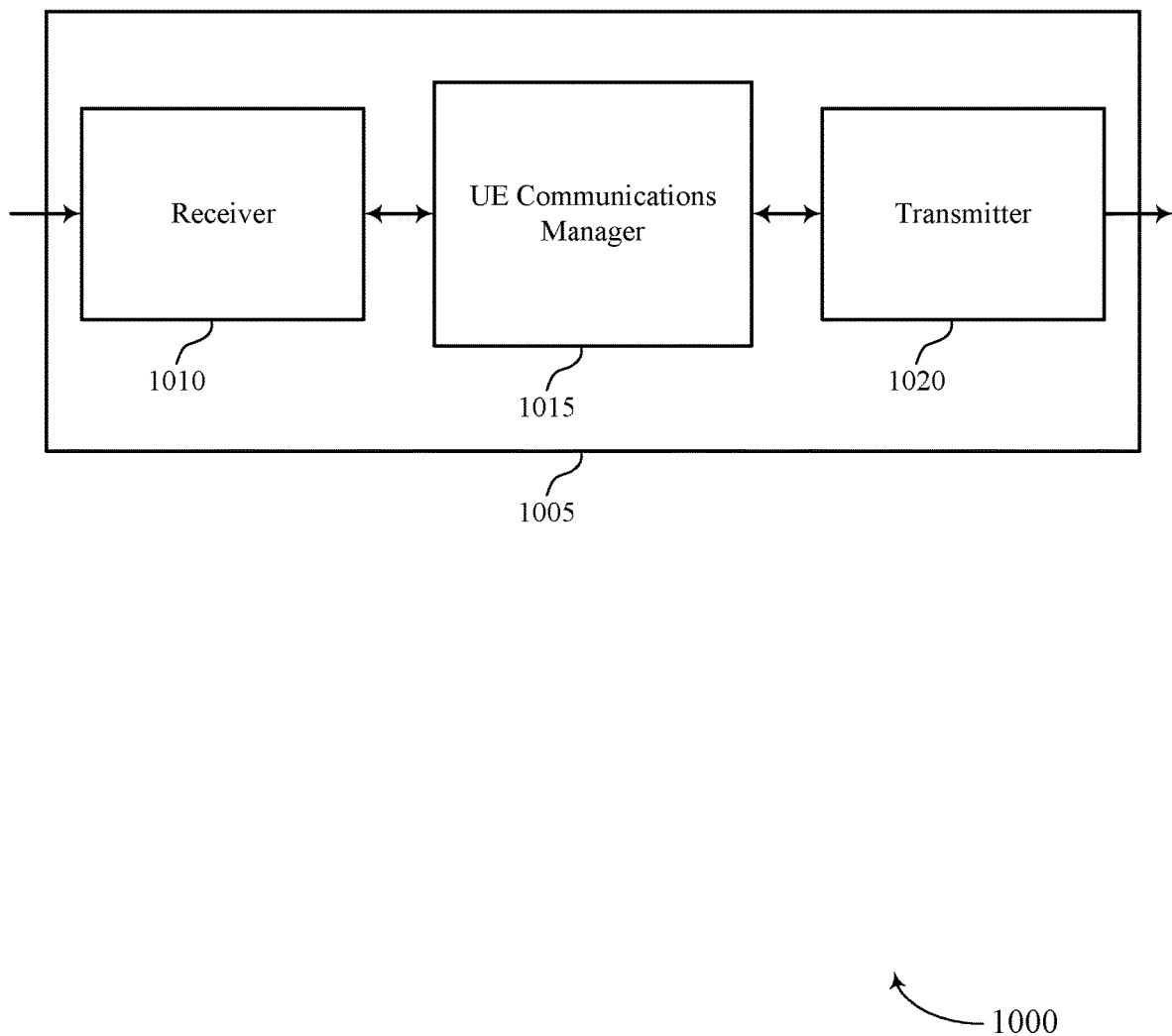
FIGS. 10 through 12 show block diagrams of a device that supports group common control channel and bandwidth part management in wireless communications in accordance with aspects of the present disclosure.

FIG. 10 shows a block diagram 1000 of a wireless device 1005 that supports group common control channel and bandwidth part management in wireless communications in accordance with aspects of the present disclosure. Wireless device 1005 may be an example of aspects of a user equipment (UE) 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to group common control channel and bandwidth part management in wireless communications, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13.

UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may transmit a NACK message associated with a downlink transmission from a base station, the downlink transmission having resources in a first bandwidth part (BWP) of a set of BWPs available for downlink transmissions, receive, responsive to the NACK message, a group downlink control message indicating a downlink resource configuration for a retransmission of the downlink transmission within a second BWP different from the first BWP, and receive the retransmission of the downlink transmission via the second BWP based on the downlink resource configuration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
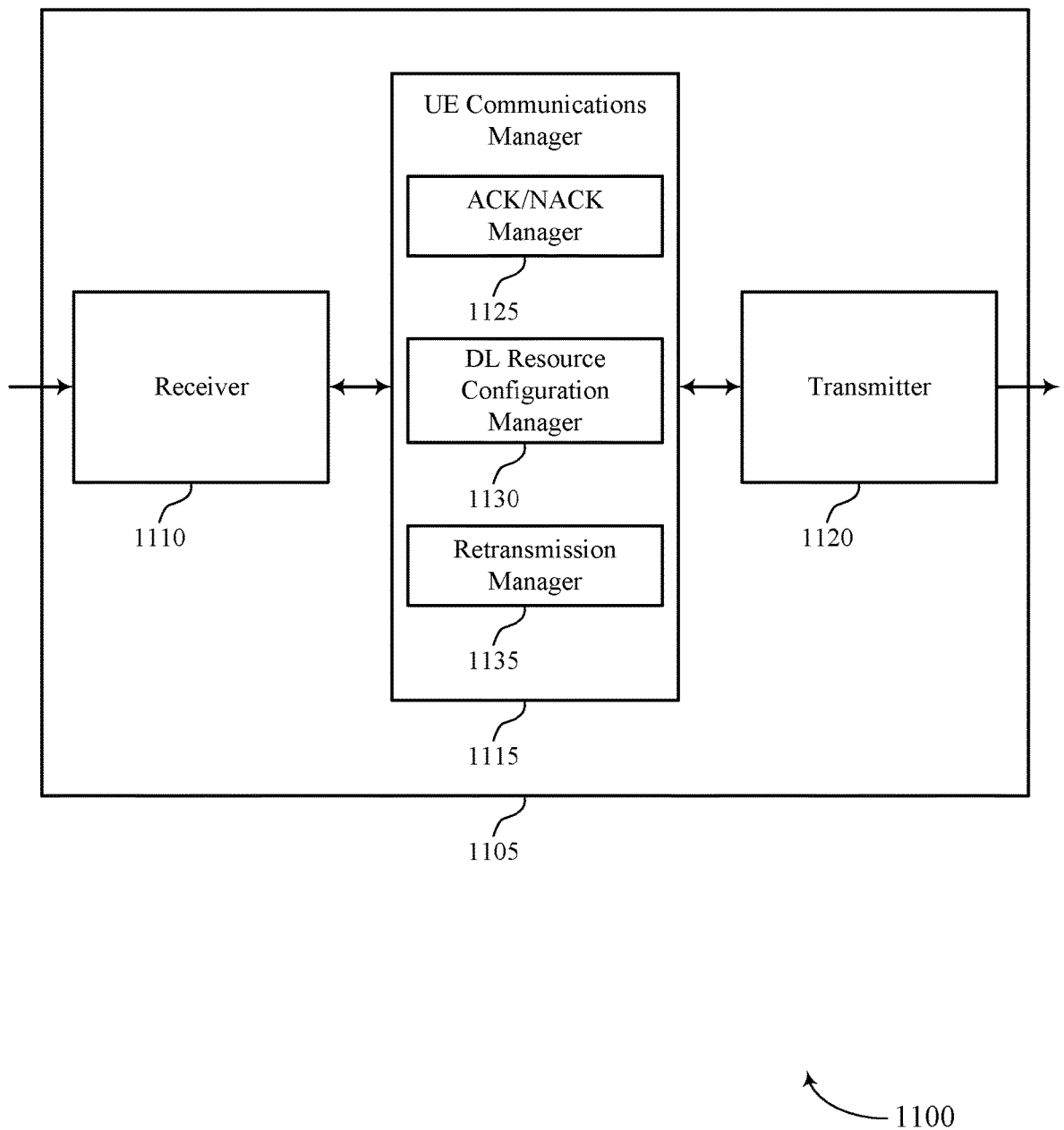

FIG. 11 shows a block diagram 1100 of a wireless device 1105 that supports group common control channel and bandwidth part management in wireless communications in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to group common control channel and bandwidth part management in wireless communications, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13. UE communications manager 1115 may also include ACK/NACK manager 1125, downlink (DL) resource configuration manager 1130, and retransmission manager 1135.

ACK/NACK manager 1125 may transmit a NACK message associated with a downlink transmission from a base station, the downlink transmission having resources in a first BWP of a set of BWPs available for downlink transmissions.

DL resource configuration manager 1130 may receive, responsive to the NACK message, a group downlink control message indicating a downlink resource configuration for a retransmission of the downlink transmission within a second BWP different from the first BWP. In some cases, DL resource configuration manager 1130 may determine the downlink resource configuration based on the group length and an indication of a second number of UEs of the set of UEs that are to receive the downlink retransmissions via the second BWP. In some cases, DL resource configuration manager 1130 may determine a resource assignment for the retransmission of the downlink transmission based on the downlink resource configuration, and select, from a preconfigured table of available downlink resource configurations for different BWPs, the downlink resource configuration based on a number of UEs that are to receive retransmissions via the second BWP. In some cases, the downlink transmission is a SPS message, and a second SPS message may be received, after receiving the retransmission, via the first BWP.

Retransmission manager 1135 may receive the retransmission of the downlink transmission via the second BWP based on the downlink resource configuration.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
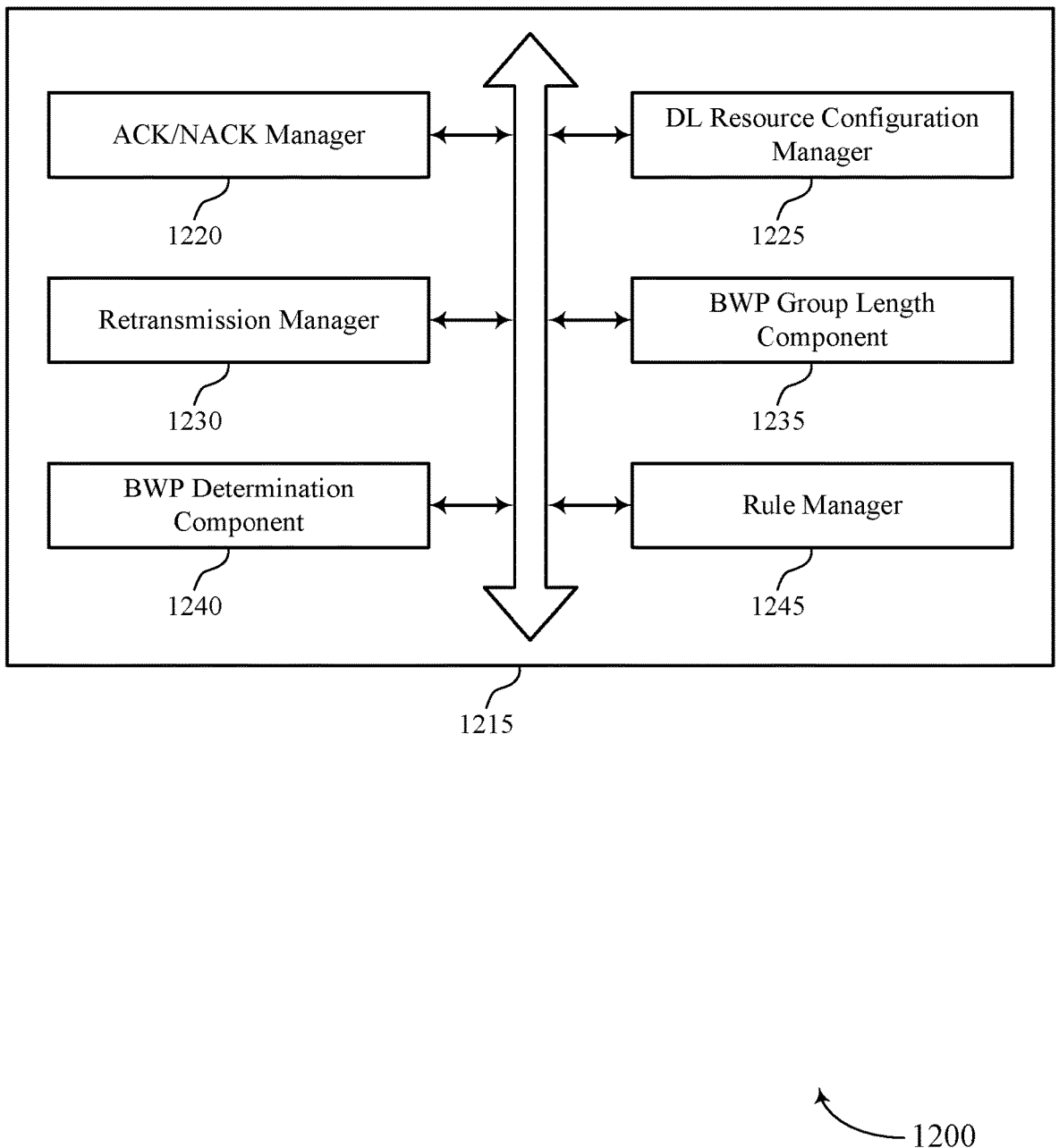

FIG. 12 shows a block diagram 1200 of a UE communications manager 1215 that supports group common control channel and bandwidth part management in wireless communications in accordance with aspects of the present disclosure. The UE communications manager 1215 may be an example of aspects of a UE communications manager 1015, a UE communications manager 1115, or a UE communications manager 1315 described with reference to FIGS. 10, 11, and 13. The UE communications manager 1215 may include ACK/NACK manager 1220, DL resource configuration manager 1225, retransmission manager 1230, BWP group length component 1235, BWP determination component 1240, and rule manager 1245. Each of these modules may communicate, directly or indirectly, with one another (e.g., via one or more buses).

ACK/NACK manager 1220 may transmit a NACK message associated with a downlink transmission from a base station, the downlink transmission having resources in a first BWP of a set of BWPs available for downlink transmissions.

DL resource configuration manager 1225 may receive, responsive to the NACK message, a group downlink control message indicating a downlink resource configuration for a retransmission of the downlink transmission within a second BWP different from the first BWP. In some cases, DL resource configuration manager 1225 may determine the downlink resource configuration based on the group length and an indication of a second number of UEs of the set of UEs that are to receive the downlink retransmissions via the second BWP. In some cases, DL resource configuration manager 1225 may determine a resource assignment for the retransmission of the downlink transmission based on the downlink resource configuration, and select, from a preconfigured table of available downlink resource configurations for different BWPs, the downlink resource configuration based on a number of UEs that are to receive retransmissions via the second BWP. In some cases, the downlink transmission is a SPS message, and a second SPS message may be received, after receiving the retransmission, via the first BWP.

Retransmission manager 1230 may receive the retransmission of the downlink transmission via the second BWP based on the downlink resource configuration.

BWP group length component 1235 may identify a group length corresponding to a first number of UEs in a set of UEs that are to receive downlink retransmissions via the second BWP. In some cases, the second number of UEs of the set of UEs that are to receive downlink transmissions via the second BWP are indicated in a bitmap within the group downlink control message. In some cases, the group length of the second BWP is updated based on the first UE having resources in the first BWP for the downlink transmission and having resources in the second BWP for the retransmission. In some cases, the group length of the first BWP is updated based on the first UE having resources in the first BWP for the downlink transmission and having resources in the second BWP for the retransmission. In some cases, the group length of the first BWP remains the same when the first UE has resources in the first BWP for the downlink transmission and has resources in the second BWP for the retransmission, and a third number of UEs of a second set of UEs that are to receive downlink retransmissions via the first BWP is updated based on the first UE having resources in the second BWP for the retransmission.

BWP determination component 1240 may identify an aggregate number of NACK messages associated with one or more BWPs that are ordered ahead of the first BWP, and may determine, based on the identified aggregate number of NACK messages, the downlink resource configuration for the retransmission of the downlink transmission. In some cases, the downlink resource configuration may be determined based on an indication in a bitmap within the group downlink control message, a number of UEs within the first BWP that are to receive downlink retransmissions, or combinations thereof. In some cases, the BWP determination component 1240 may switch, based on the bitmap, the downlink resource configuration, or combinations thereof, to the second BWP.

Rule manager 1245 may receive an indication of one or more rules to be applied to information included in the group downlink control message and identify the downlink resource configuration to be used for the retransmission of the downlink transmission. In some cases, at least one rule includes evenly dividing a set of available resources within the second BWP between one or more UEs that are to receive retransmissions via the second BWP. In some cases, at least one rule includes dividing a set of available resources within the second BWP between one or more UEs that are to receive retransmissions via the second BWP, the dividing based on a number of resource blocks that are associated with each UE of the one or more UEs. In some cases, at least one rule includes referencing a table based on an index value assigned to the UE that indicates the downlink resource configuration.

Figure 13:
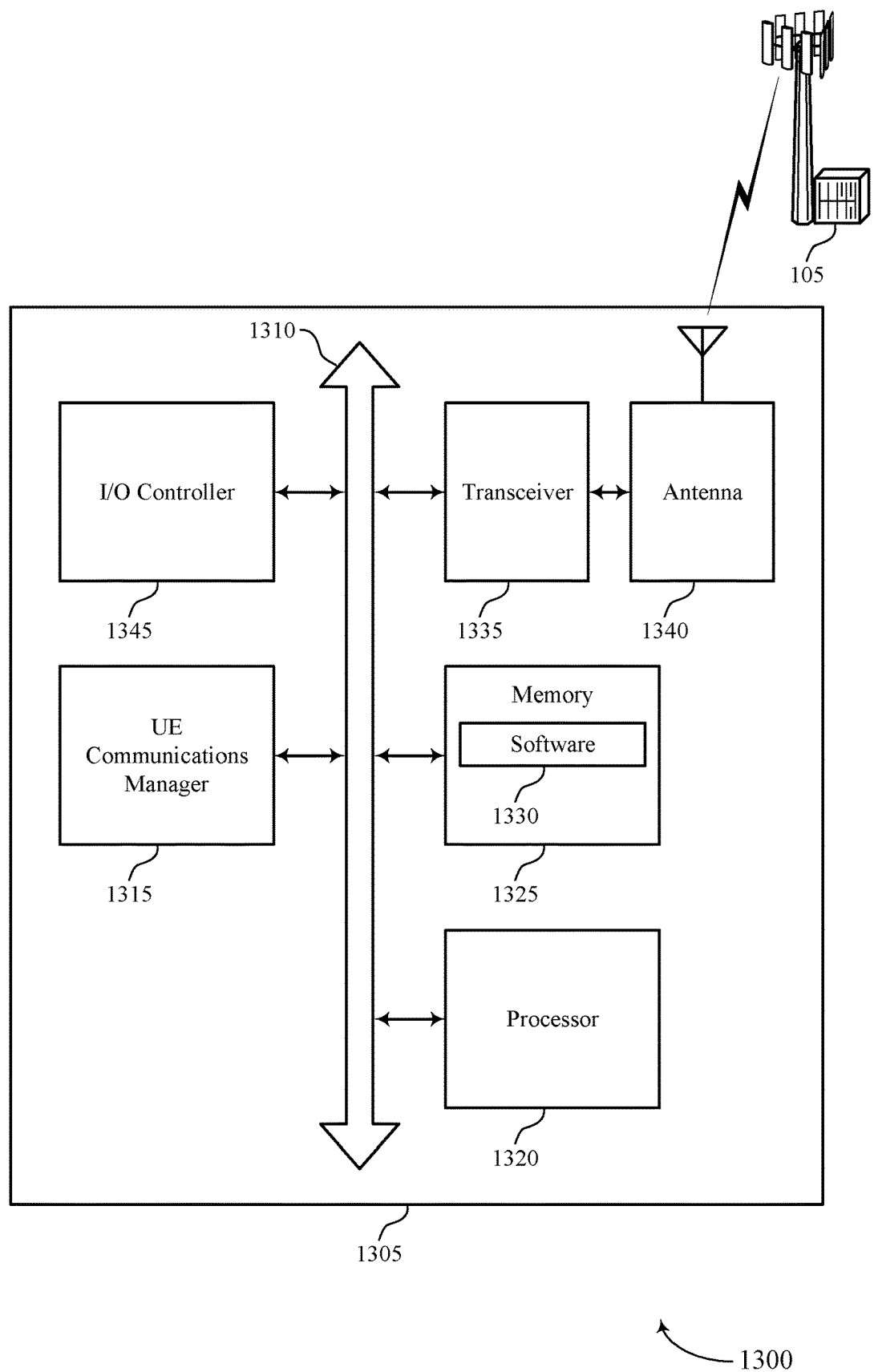
FIG. 13 illustrates a block diagram of a system including a UE that supports group common control channel and bandwidth part management in wireless communications in accordance with aspects of the present disclosure.

FIG. 13 shows a diagram of a system 1300 including a device 1305 that supports group common control channel and bandwidth part management in wireless communications in accordance with aspects of the present disclosure. Device 1305 may be an example of or include the components of wireless device 1005, wireless device 1105, or a UE 115 as described above, e.g., with reference to FIGS. 10 and 11. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting group common control channel and bandwidth part management in wireless communications).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support group common control channel and bandwidth part management in wireless communications. Software 1330 may be stored in a non-transitory computer-readable medium such as system memory or other memory. In some cases, the software 1330 may not be directly executable by the processor but may cause a computer (e.g., when compiled and executed) to perform functions described herein, such as functions as discussed with respect to FIGS. 18-20.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
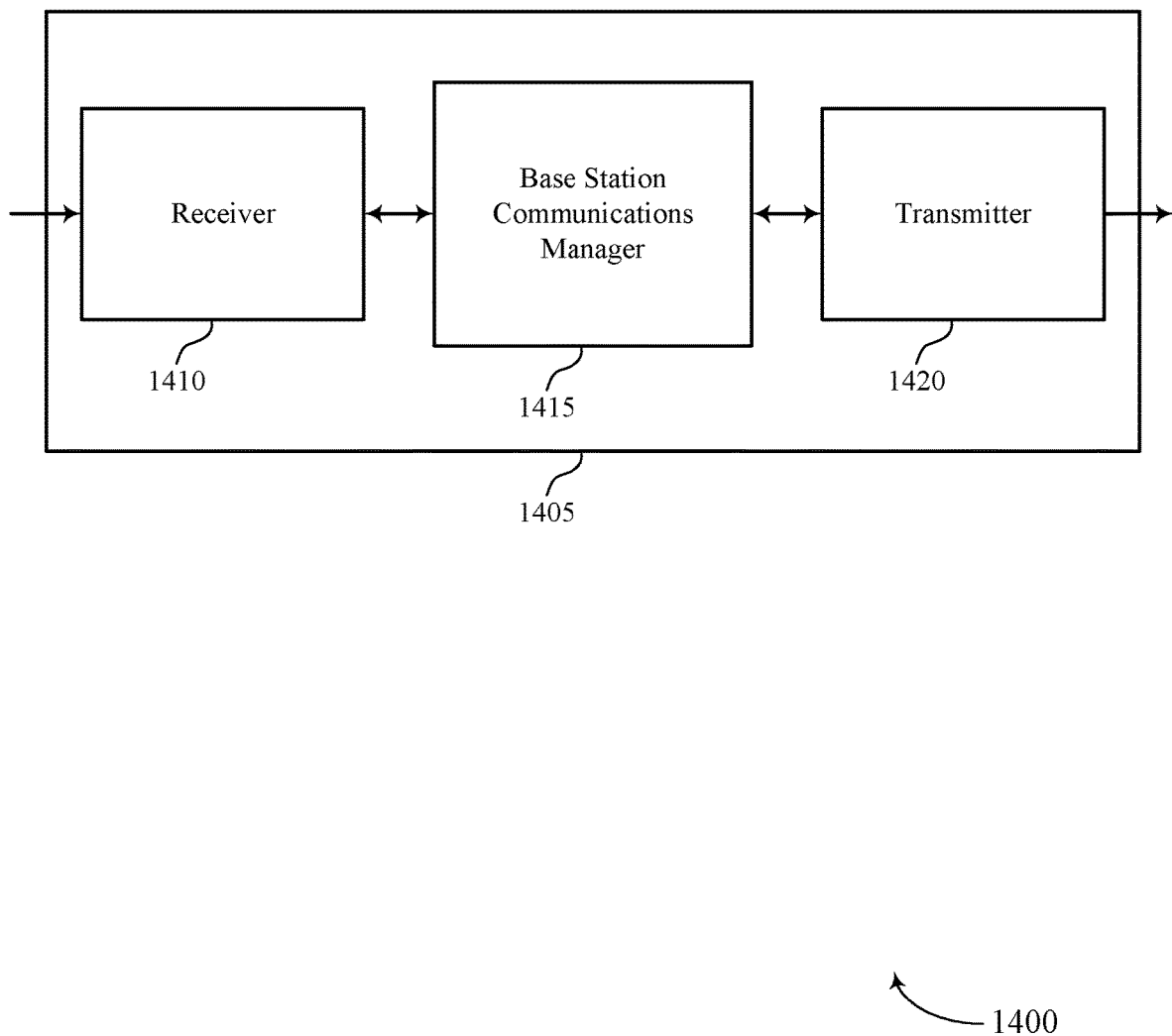
FIGS. 14 through 16 show block diagrams of a device that supports group common control channel and bandwidth part management in wireless communications in accordance with aspects of the present disclosure.

FIG. 14 shows a block diagram 1400 of a wireless device 1405 that supports group common control channel and bandwidth part management in wireless communications in accordance with aspects of the present disclosure. Wireless device 1405 may be an example of aspects of a base station 105 as described herein. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to group common control channel and bandwidth part management in wireless communications, etc.). Information may be passed on to other components of the device. The receiver 1410 may be an example of aspects of the transceiver 1735 described with reference to FIG. 17. The receiver 1410 may utilize a single antenna or a set of antennas.

Base station communications manager 1415 may be an example of aspects of the base station communications manager 1715 described with reference to FIG. 17.

Base station communications manager 1415 and/or at least some of its various sub-components may be implemented in hardware, software executed by a processor, firmware, or any combination thereof. If implemented in software executed by a processor, the functions of the base station communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1415 and/or at least some of its various sub-components may be physically located at various positions, including being distributed such that portions of functions are implemented at different physical locations by one or more physical devices. In some examples, base station communications manager 1415 and/or at least some of its various sub-components may be a separate and distinct component in accordance with various aspects of the present disclosure. In other examples, base station communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1415 may transmit a set of downlink transmissions to a set of UEs via a set of BWPs, where a first subset of downlink transmissions are transmitted to a first subset of UEs via a first BWP, receive NACK messages from two or more of the set of UEs, the NACK messages initiating retransmissions of corresponding downlink transmissions to the two or more UEs, dynamically switch a first UE of the two or more UEs from the first BWP to a second BWP different than the first BWP for the associated retransmission to the first UE, the switching based on a number of UEs of the first BWP and the second BWP that have associated retransmissions, and transmit a group downlink control message to each of the two or more UEs that indicates a downlink resource configuration for each of the two or more UEs and includes information sufficient for the first UE to identify retransmission resources within the second BWP.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
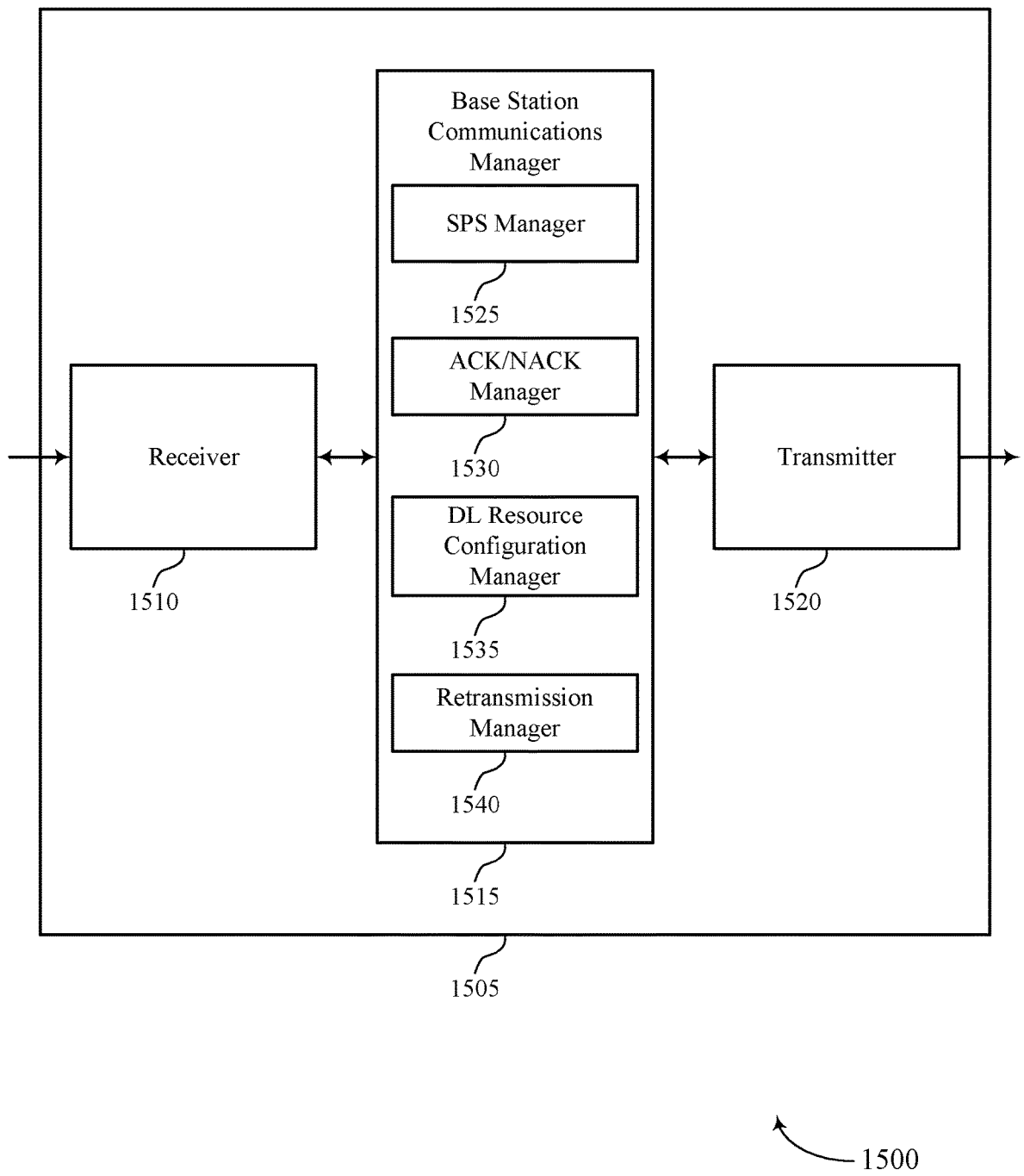

FIG. 15 shows a block diagram 1500 of a wireless device 1505 that supports group common control channel and bandwidth part management in wireless communications in accordance with aspects of the present disclosure. Wireless device 1505 may be an example of aspects of a wireless device 1405 or a base station 105 as described with reference to FIG. 14. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to group common control channel and bandwidth part management in wireless communications, etc.). Information may be passed on to other components of the device. The receiver 1510 may be an example of aspects of the transceiver 1735 described with reference to FIG. 17. The receiver 1510 may utilize a single antenna or a set of antennas.

Base station communications manager 1515 may be an example of aspects of the base station communications manager 1715 described with reference to FIG. 17.

Base station communications manager 1515 may also include SPS manager 1525, ACK/NACK manager 1530, DL resource configuration manager 1535, and retransmission manager 1540.

SPS manager 1525 may transmit a set of downlink transmissions to a set of UEs via a set of BWPs, where a first subset of downlink transmissions are transmitted to a first subset of UEs via a first BWP. In some cases, SPS manager 1525 may transmit, after a retransmission via a second BWP, a second set of downlink transmissions to the set of UEs, the second set of downlink transmissions including a second downlink transmission to the first UE that is transmitted using the first BWP.

ACK/NACK manager 1530 may receive NACK messages from two or more of the set of UEs, the NACK messages initiating retransmissions of corresponding downlink transmissions to the two or more UEs.

DL resource configuration manager 1535 may dynamically switch a first UE of the two or more UEs from the first BWP to a second BWP different than the first BWP for the associated retransmission to the first UE, the switching based on a number of UEs of the first BWP and the second BWP that have associated retransmissions. In some cases, DL resource configuration manager 1535 may select, from a preconfigured table of available downlink resource configurations for different BWPs, the downlink resource configuration based on a number of UEs that are to receive the retransmissions via each BWP. In some cases, the group downlink control message includes a group common physical downlink control channel (GC-PDCCH) message.

Retransmission manager 1540 may transmit a group downlink control message to each of the two or more UEs that indicates a downlink resource configuration for each of the two or more UEs and includes information sufficient for the first UE to identify retransmission resources within the second BWP, and retransmit the downlink transmission of the first UE using the second BWP.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
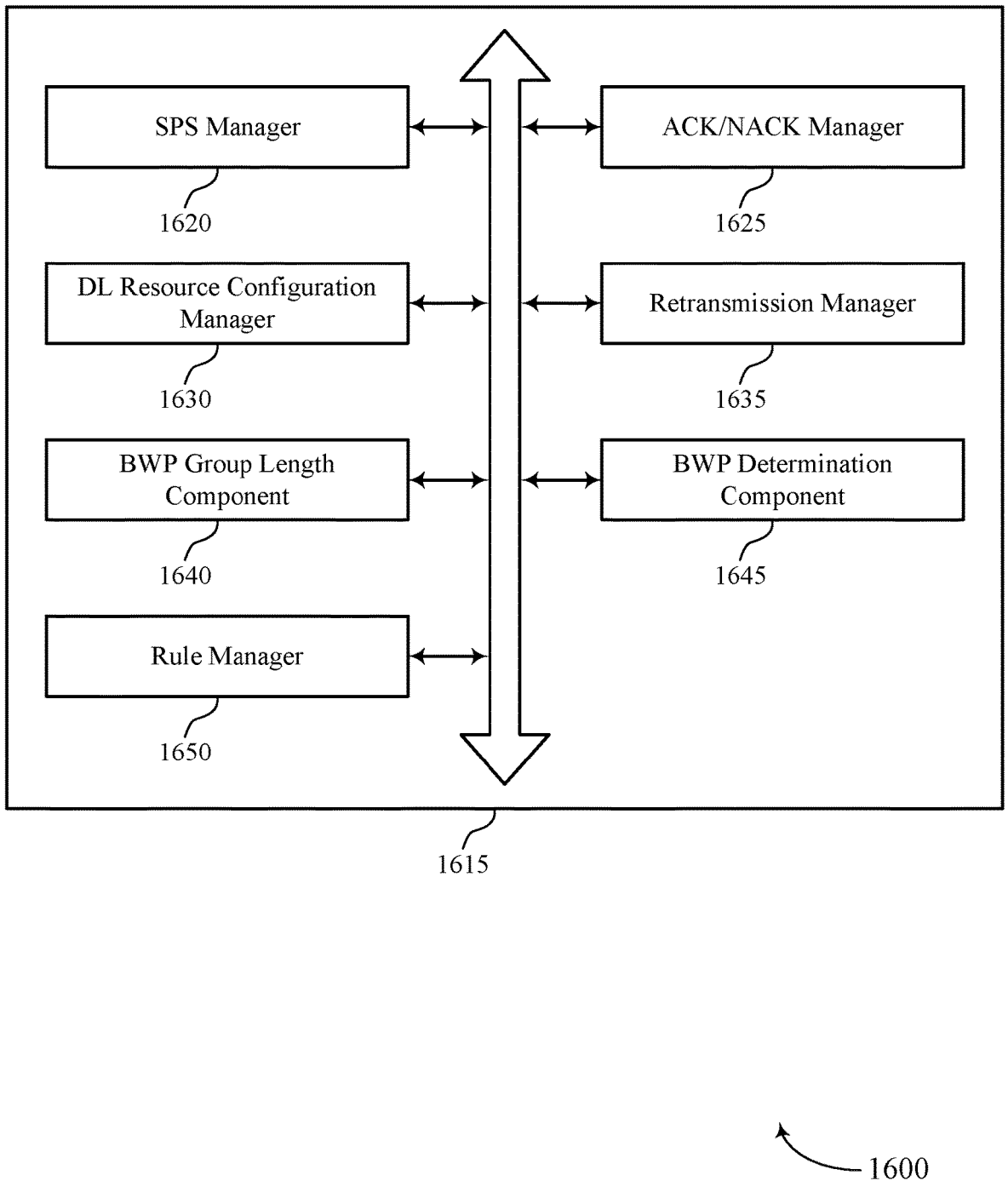

FIG. 16 shows a block diagram 1600 of a base station communications manager 1615 that supports group common control channel and bandwidth part management in wireless communications in accordance with aspects of the present disclosure. The base station communications manager 1615 may be an example of aspects of a base station communications manager 1715 described with reference to FIGS. 14, 15, and 17. The base station communications manager 1615 may include SPS manager 1620, ACK/NACK manager 1625, DL resource configuration manager 1630, retransmission manager 1635, BWP group length component 1640, BWP determination component 1645, and rule manager 1650. Each of these modules may communicate, directly or indirectly, with one another (e.g., via one or more buses).

SPS manager 1620 may transmit a set of downlink transmissions to a set of UEs via a set of BWPs, where a first subset of downlink transmissions are transmitted to a first subset of UEs via a first BWP. In some cases, SPS manager 1620 may transmit, after a retransmission via a second BWP, a second set of downlink transmissions to the set of UEs, the second set of downlink transmissions including a second downlink transmission to the first UE that is transmitted using the first BWP.

ACK/NACK manager 1625 may receive NACK messages from two or more of the set of UEs, the NACK messages initiating retransmissions of corresponding downlink transmissions to the two or more UEs.

DL resource configuration manager 1630 may dynamically switch a first UE of the two or more UEs from the first BWP to a second BWP different than the first BWP for the associated retransmission to the first UE, the switching based on a number of UEs of the first BWP and the second BWP that have associated retransmissions. In some cases, DL resource configuration manager 1630 may select, from a preconfigured table of available downlink resource configurations for different BWPs, the downlink resource configuration based on a number of UEs that are to receive the retransmissions via each BWP. In some cases, the group downlink control message includes a group common physical downlink control channel (GC-PDCCH) message.

Retransmission manager 1635 may transmit a group downlink control message to each of the two or more UEs that indicates a downlink resource configuration for each of the two or more UEs and includes information sufficient for the first UE to identify retransmission resources within the second BWP, and retransmit the downlink transmission of the first UE using the second BWP.

BWP group length component 1640 may identify a group length corresponding to a first number of UEs of a second subset of UEs associated with the second BWP plus the first UE, identify a second number of UEs that are to receive downlink retransmissions via the second BWP based on the downlink resource configuration, and transmit the group length and the second number of UEs to the two or more UEs. In some cases, the second number of UEs that are to receive downlink transmissions via the second BWP are indicated in a bitmap within the group downlink control message. In some cases, the group length of the second BWP is updated from a prior group length of the second BWP based on the first UE having resources in the second BWP for the retransmissions. In some cases, the group length of the first BWP remains the same as a prior group length of the first BWP when the first UE has resources in the second BWP for the retransmissions, and a third number of UEs that are to receive downlink retransmissions via the first BWP is updated based on the first UE having resources in the second BWP for the retransmissions.

BWP determination component 1645 may identify an ordered set of BWPs that are to be used for the retransmissions, identify, for each BWP of the ordered set of BWPs, an aggregate number of NACK messages associated with any prior BWPs of the ordered set of BWPs, and determine, based on the identified aggregate number of NACK messages for each BWP, the downlink resource configuration for the retransmissions of each BWP, where one or more UEs of one or more BWPs for the downlink transmissions may be switched to a different BWP for the retransmissions. In some cases, the downlink resource configuration further includes a bitmap within the group downlink control message for each BWP that indicates a number of UEs within each BWP that are to receive downlink retransmissions, and the determining is further based on the bitmap.

Rule manager 1650 may transmit an indication of one or more rules to be applied to information included in the group downlink control message for identifying the downlink resource configuration to be used for the retransmissions. In some cases, at least one rule includes evenly dividing a set of available resources within each BWP between one or more UEs that are to receive the retransmissions via the BWP. In some cases, at least one rule includes dividing a set of available resources within each BWP between one or more UEs that are to receive the retransmissions via the BWP, the dividing based on a number of resource blocks that are associated with each UE.

Figure 17:
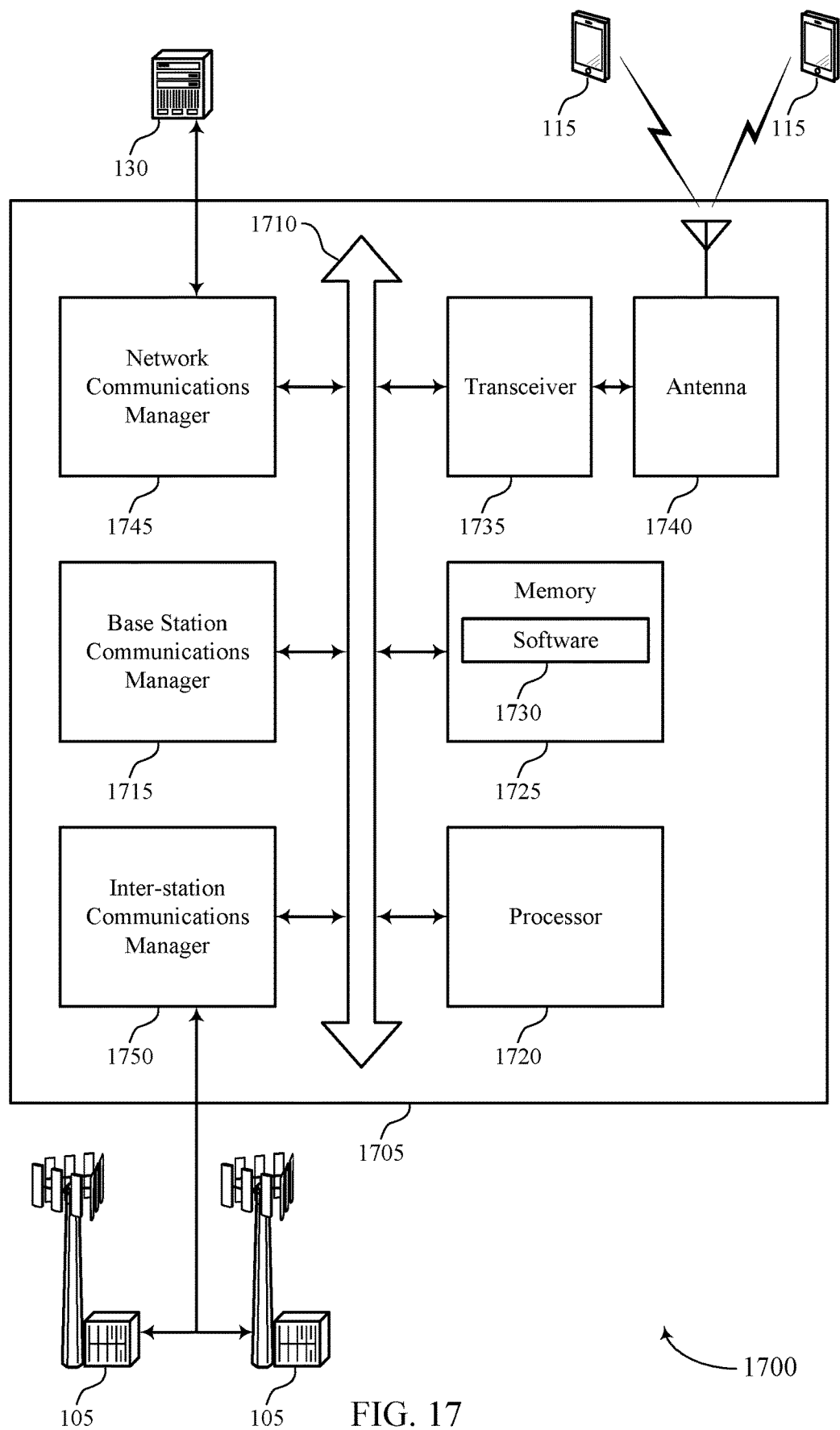
FIG. 17 illustrates a block diagram of a system including a base station that supports group common control channel and bandwidth part management in wireless communications in accordance with aspects of the present disclosure.

FIG. 17 shows a diagram of a system 1700 including a device 1705 that supports group common control channel and bandwidth part management in wireless communications in accordance with aspects of the present disclosure. Device 1705 may be an example of or include the components of base station 105 as described above, e.g., with reference to FIG. 1. Device 1705 may include components for bi-directional voice and data communications including components for transmitting and receiving communications, including base station communications manager 1715, processor 1720, memory 1725, software 1730, transceiver 1735, antenna 1740, network communications manager 1745, and inter-station communications manager 1750. These components may be in electronic communication via one or more buses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting group common control channel and bandwidth part management in wireless communications).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support group common control channel and bandwidth part management in wireless communications. Software 1730 may be stored in a non-transitory computer-readable medium such as system memory or other memory. In some cases, the software 1730 may not be directly executable by the processor but may cause a computer (e.g., when compiled and executed) to perform functions described herein, such as functions as discussed with respect to FIGS. 21-24.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network (e.g., via one or more wired backhaul links). For example, the network communications manager 1745 may manage the transfer of data communications for client devices, such as one or more UEs 115.

Inter-station communications manager 1750 may manage communications with other base station 105, and may include a controller or scheduler for controlling communications with UEs 115 in cooperation with other base stations 105. For example, the inter-station communications manager 1750 may coordinate scheduling for transmissions to UEs 115 for various interference mitigation techniques such as beamforming or joint transmission. In some examples, inter-station communications manager 1750 may provide an X2 interface within an Long Term Evolution (LTE)/LTE-A wireless communication network technology to provide communication between base stations 105.

Figure 18:
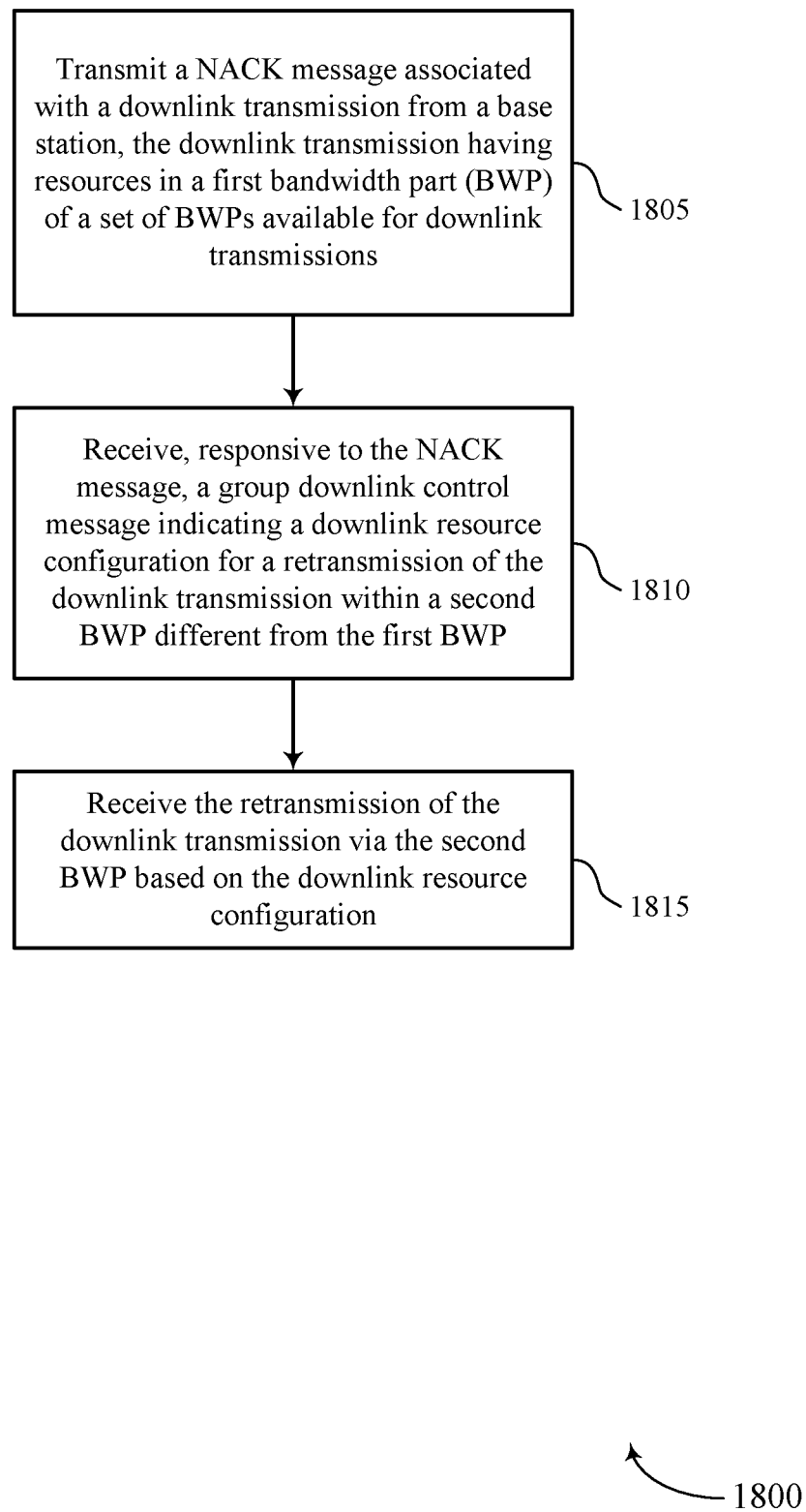
FIGS. 18 through 24 illustrate methods for group common control channel and bandwidth part management in wireless communications in accordance with aspects of the present disclosure.

FIG. 18 shows a flowchart illustrating a method 1800 for group common control channel and bandwidth part management in wireless communications in accordance with aspects of the present disclosure. The operations of method 1800 may be implemented by a UE 115 or its components as described herein. For example, the operations of method 1800 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may transmit a NACK message associated with a downlink transmission from a base station, the downlink transmission having resources in a first BWP of a plurality of BWPs available for downlink transmissions. The operations of 1805 may be performed according to the methods described herein. In certain examples, aspects of the operations of 1805 may be performed by a ACK/NACK manager as described with reference to FIGS. 10 through 13.

At 1810 the UE 115 may receive, responsive to the NACK message, a group downlink control message indicating a downlink resource configuration for a retransmission of the downlink transmission within a second BWP different from the first BWP. The operations of 1810 may be performed according to the methods described herein. In certain examples, aspects of the operations of 1810 may be performed by a DL resource configuration manager as described with reference to FIGS. 10 through 13.

At 1815 the UE 115 may receive the retransmission of the downlink transmission via the second BWP based at least in part on the downlink resource configuration. The operations of 1815 may be performed according to the methods described herein. In certain examples, aspects of the operations of 1815 may be performed by a retransmission manager as described with reference to FIGS. 10 through 13.

Figure 19:
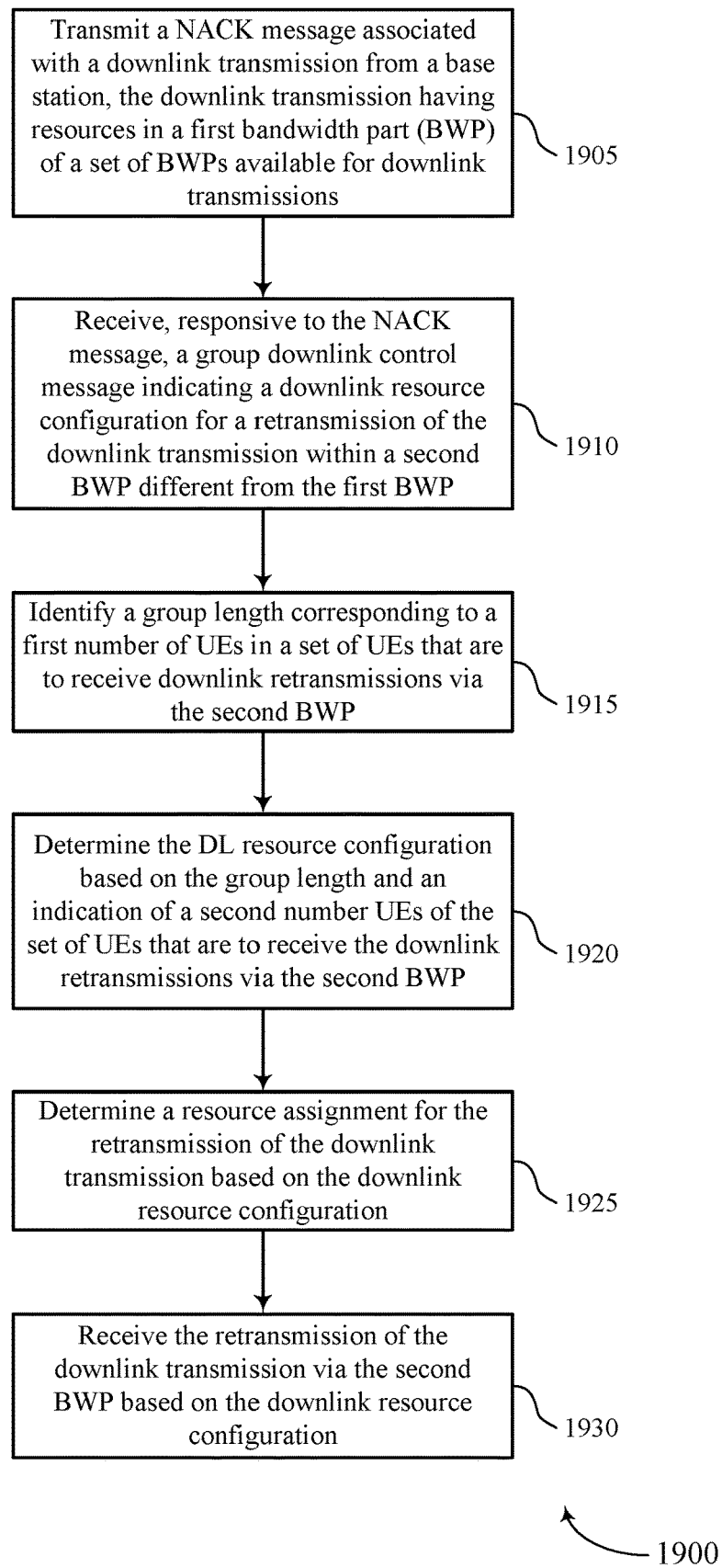

FIG. 19 shows a flowchart illustrating a method 1900 for group common control channel and bandwidth part management in wireless communications in accordance with aspects of the present disclosure. The operations of method 1900 may be implemented by a UE 115 or its components as described herein. For example, the operations of method 1900 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may transmit a NACK message associated with a downlink transmission from a base station, the downlink transmission having resources in a BWP of a plurality of BWPs available for downlink transmissions. The operations of 1905 may be performed according to the methods described herein. In certain examples, aspects of the operations of 1905 may be performed by a ACK/NACK manager as described with reference to FIGS. 10 through 13.

At 1910 the UE 115 may receive, responsive to the NACK message, a group downlink control message indicating a downlink resource configuration for a retransmission of the downlink transmission within a second BWP different from the first BWP. The operations of 1910 may be performed according to the methods described herein. In certain examples, aspects of the operations of 1910 may be performed by a DL resource configuration manager as described with reference to FIGS. 10 through 13.

At 1915 the UE 115 may identify a group length corresponding to a first number of UEs in a set of UEs that are to receive downlink retransmissions via the second BWP. The operations of 1915 may be performed according to the methods described herein. In certain examples, aspects of the operations of 1915 may be performed by a BWP group length component as described with reference to FIGS. 10 through 13.

At 1920 the UE 115 may determine the downlink resource configuration based at least in part on the group length and an indication of a second number of UEs of the set of UEs that are to receive the downlink retransmissions via the second BWP. The operations of 1920 may be performed according to the methods described herein. In certain examples, aspects of the operations of 1920 may be performed by a DL resource configuration manager as described with reference to FIGS. 10 through 13.

At 1925 the UE 115 may determine a resource assignment for the retransmission of the downlink transmission based at least in part on the downlink resource configuration. The operations of 1925 may be performed according to the methods described herein. In certain examples, aspects of the operations of 1925 may be performed by a DL resource configuration manager as described with reference to FIGS. 10 through 13.

At 1930 the UE 115 may receive the retransmission of the downlink transmission via the second BWP based at least in part on the downlink resource configuration. The operations of 1930 may be performed according to the methods described herein. In certain examples, aspects of the operations of 1930 may be performed by a retransmission manager as described with reference to FIGS. 10 through 13.

Figure 20:
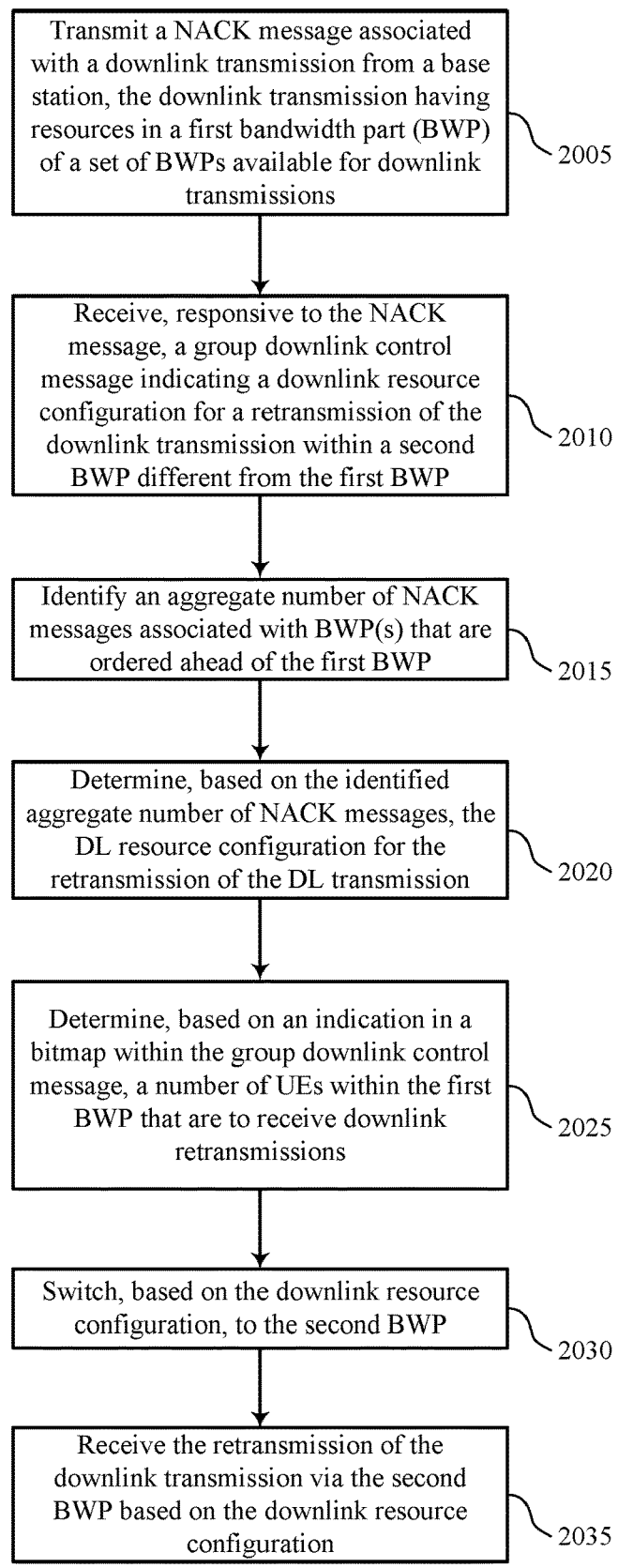

FIG. 20 shows a flowchart illustrating a method 2000 for group common control channel and bandwidth part management in wireless communications in accordance with aspects of the present disclosure. The operations of method 2000 may be implemented by a UE 115 or its components as described herein. For example, the operations of method 2000 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may transmit a NACK message associated with a downlink transmission from a base station, the downlink transmission having resources in a BWP of a plurality of BWPs available for downlink transmissions. The operations of 2005 may be performed according to the methods described herein. In certain examples, aspects of the operations of 2005 may be performed by a ACK/NACK manager as described with reference to FIGS. 10 through 13.

At 2010 the UE 115 may receive, responsive to the NACK message, a group downlink control message indicating a downlink resource configuration for a retransmission of the downlink transmission within a second BWP different from the first BWP. The operations of 2010 may be performed according to the methods described herein. In certain examples, aspects of the operations of 2010 may be performed by a DL resource configuration manager as described with reference to FIGS. 10 through 13.

At 2015 the UE 115 may identify an aggregate number of NACK messages associated with one or more BWPs that are ordered ahead of the first BWP. The operations of 2015 may be performed according to the methods described herein. In certain examples, aspects of the operations of 2015 may be performed by a BWP determination component as described with reference to FIGS. 10 through 13.

At 2020 the UE 115 may determine, based at least in part on the identified aggregate number of NACK messages, the downlink resource configuration for the retransmission of the downlink transmission. The operations of 2020 may be performed according to the methods described herein. In certain examples, aspects of the operations of 2020 may be performed by a BWP determination component as described with reference to FIGS. 10 through 13.

At 2025 the UE 115 may determine, based on an indication in a bitmap within the group downlink control message, a number of UEs within the first BWP that are to receive downlink retransmissions. The operations of 2025 may be performed according to the methods described herein. In certain examples, aspects of the operations of 2025 may be performed by a BWP determination component as described with reference to FIGS. 10 through 13.

At 2030 the UE 115 may switch, based at least in part on the downlink resource configuration, to the second BWP. The operations of 2030 may be performed according to the methods described herein. In certain examples, aspects of the operations of 2030 may be performed by a BWP determination component as described with reference to FIGS. 10 through 13.

At 2035 the UE 115 may receive the retransmission of the downlink transmission via the second BWP based at least in part on the downlink resource configuration. The operations of 2035 may be performed according to the methods described herein. In certain examples, aspects of the operations of 2035 may be performed by a retransmission manager as described with reference to FIGS. 10 through 13.

Figure 21:
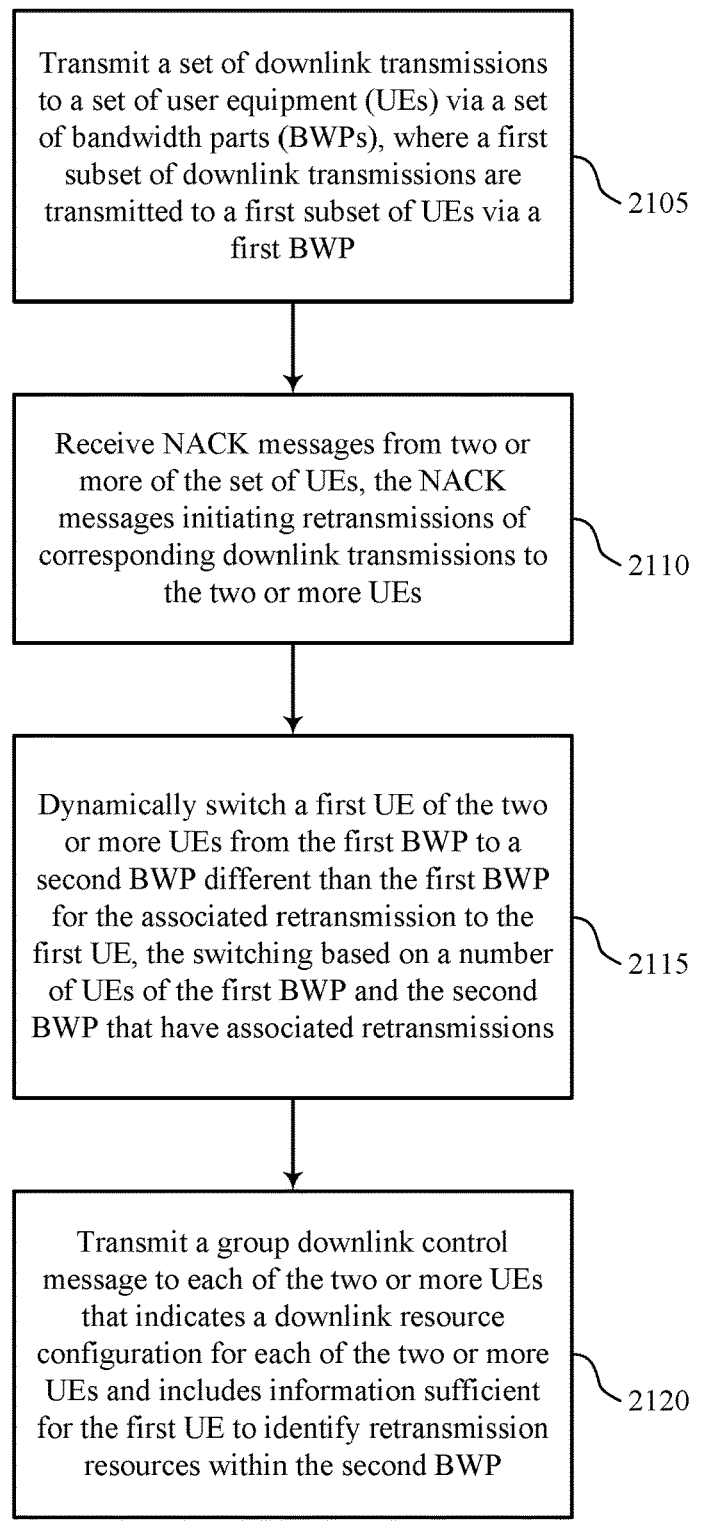

FIG. 21 shows a flowchart illustrating a method 2100 for group common control channel and bandwidth part management in wireless communications in accordance with aspects of the present disclosure. The operations of method 2100 may be implemented by a base station 105 or its components as described herein. For example, the operations of method 2100 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may transmit a set of downlink transmissions to a plurality of UEs via a set of BWPs, wherein a first subset of downlink transmissions are transmitted to a first subset of UEs via a first BWP. The operations of 2105 may be performed according to the methods described herein. In certain examples, aspects of the operations of 2105 may be performed by a SPS manager as described with reference to FIGS. 14 through 17.

At 2110 the base station 105 may receive NACK messages from two or more of the set of UEs, the NACK messages initiating retransmissions of corresponding downlink transmissions to the two or more UEs. The operations of 2110 may be performed according to the methods described herein. In certain examples, aspects of the operations of 2110 may be performed by a ACK/NACK manager as described with reference to FIGS. 14 through 17.

At 2115 the base station 105 may dynamically switch a first UE of the two or more UEs from the first BWP to a second BWP different than the first BWP for the associated retransmission to the first UE, the switching based at least in part on a number of UEs of the first BWP and the second BWP that have associated retransmissions. The operations of 2115 may be performed according to the methods described herein. In certain examples, aspects of the operations of 2115 may be performed by a DL resource configuration manager as described with reference to FIGS. 14 through 17.

At 2120 the base station 105 may transmit a group downlink control message to each of the two or more UEs that indicates a downlink resource configuration for each of the two or more UEs and includes information sufficient for the first UE to identify retransmission resources within the second BWP. The operations of 2120 may be performed according to the methods described herein. In certain examples, aspects of the operations of 2120 may be performed by a retransmission manager as described with reference to FIGS. 14 through 17.

Figure 22:
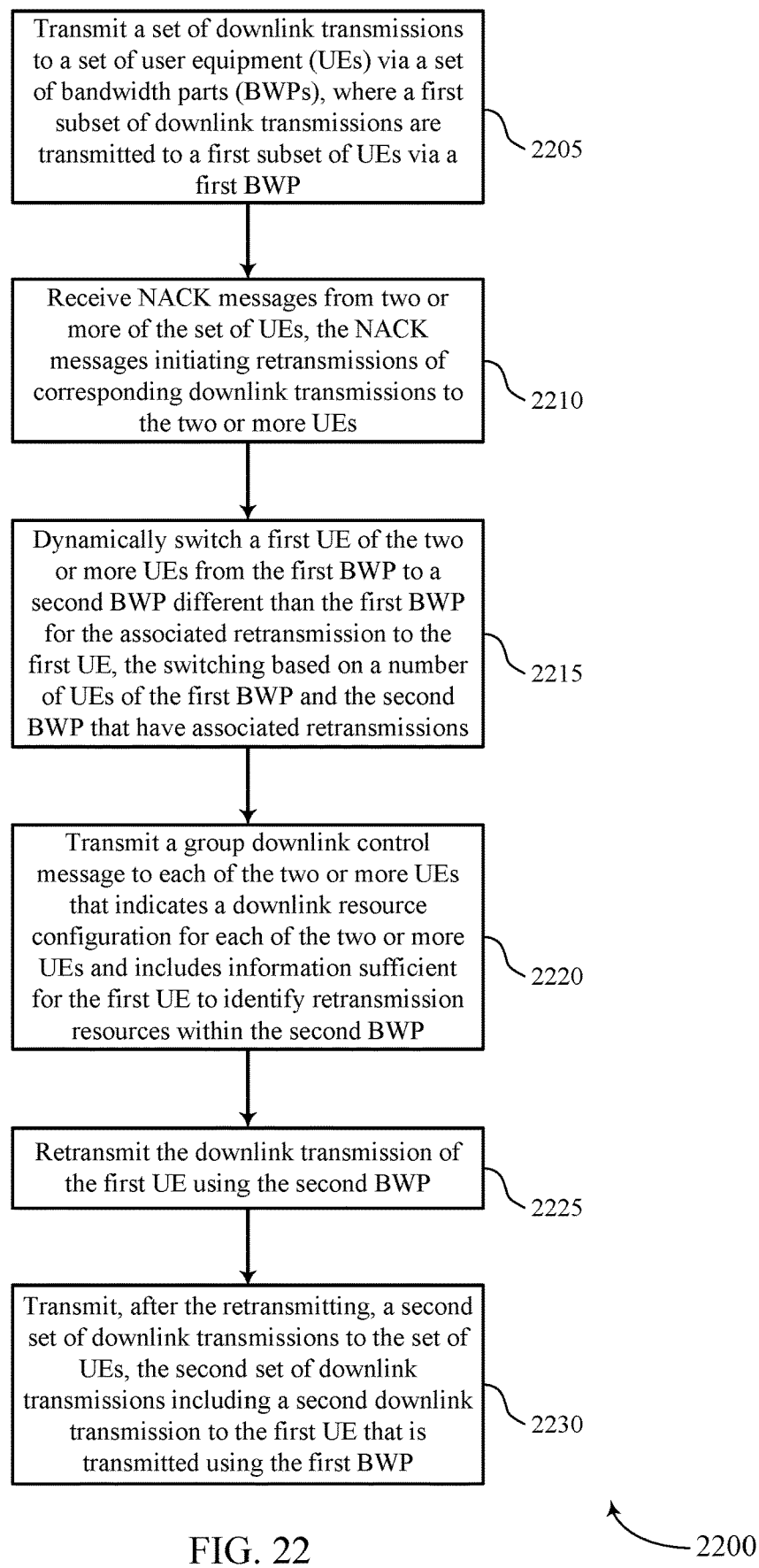

FIG. 22 shows a flowchart illustrating a method 2200 for group common control channel and bandwidth part management in wireless communications in accordance with aspects of the present disclosure. The operations of method 2200 may be implemented by a base station 105 or its components as described herein. For example, the operations of method 2200 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may transmit a set of downlink transmissions to a set of UEs via a set of BWPs, where a first subset of downlink transmissions are transmitted to a first subset of UEs via a first BWP. The operations of 2205 may be performed according to the methods described herein. In certain examples, aspects of the operations of 2205 may be performed by a SPS manager as described with reference to FIGS. 14 through 17.

At 2210 the base station 105 may receive NACK messages from two or more of the plurality of UEs, the NACK messages initiating retransmissions of corresponding downlink transmissions to the two or more UEs. The operations of 2210 may be performed according to the methods described herein. In certain examples, aspects of the operations of 2210 may be performed by a ACK/NACK manager as described with reference to FIGS. 14 through 17.

At 2215 the base station 105 may dynamically switch a first UE of the two or more UEs from the first BWP to a second BWP different than the first BWP for the associated retransmission to the first UE, the switching based at least in part on a number of UEs of the first BWP and the second BWP that have associated retransmissions. The operations of 2215 may be performed according to the methods described herein. In certain examples, aspects of the operations of 2215 may be performed by a DL resource configuration manager as described with reference to FIGS. 14 through 17.

At 2220 the base station 105 may transmit a group downlink control message to each of the two or more UEs that indicates a downlink resource configuration for each of the two or more UEs and includes information sufficient for the first UE to identify retransmission resources within the second BWP. The operations of 2220 may be performed according to the methods described herein. In certain examples, aspects of the operations of 2220 may be performed by a retransmission manager as described with reference to FIGS. 14 through 17.

At 2225 the base station 105 may retransmit the downlink transmission of the first UE using the second BWP. The operations of 2225 may be performed according to the methods described herein. In certain examples, aspects of the operations of 2225 may be performed by a retransmission manager as described with reference to FIGS. 14 through 17.

At 2230 the base station 105 may transmit, after the retransmitting, a second plurality of downlink transmissions to the plurality of UEs, the second plurality of downlink transmissions including a second downlink transmission to the first UE that is transmitted using the first BWP. The operations of 2230 may be performed according to the methods described herein. In certain examples, aspects of the operations of 2230 may be performed by a SPS manager as described with reference to FIGS. 14 through 17.

Figure 23:
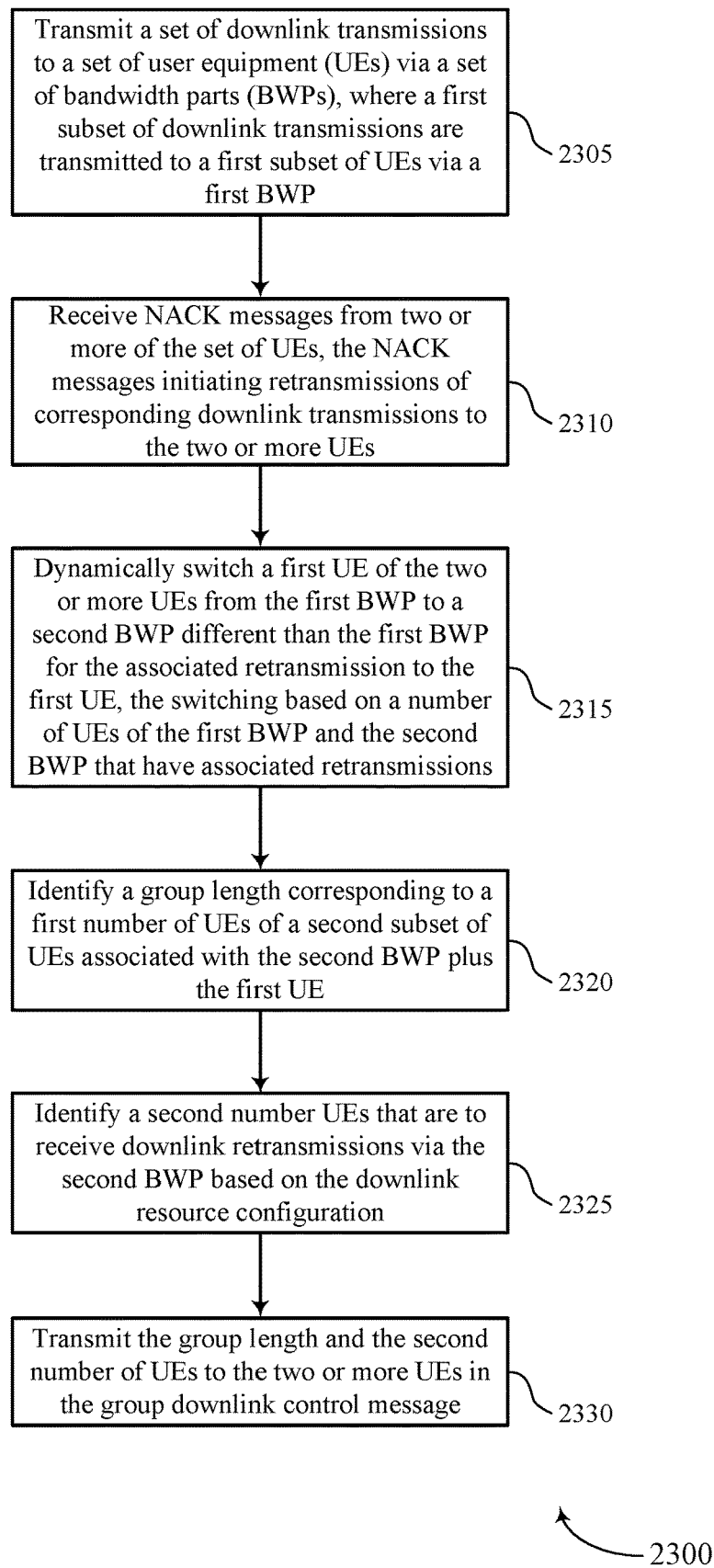

FIG. 23 shows a flowchart illustrating a method 2300 for group common control channel and bandwidth part management in wireless communications in accordance with aspects of the present disclosure. The operations of method 2300 may be implemented by a base station 105 or its components as described herein. For example, the operations of method 2300 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2305 the base station 105 may transmit a set of downlink transmissions to a set of UEs via a set of BWPs, where a first subset of downlink transmissions are transmitted to a first subset of UEs via a first BWP. The operations of 2305 may be performed according to the methods described herein. In certain examples, aspects of the operations of 2305 may be performed by a SPS manager as described with reference to FIGS. 14 through 17.

At 2310 the base station 105 may receive NACK messages from two or more of the plurality of UEs, the NACK messages initiating retransmissions of corresponding downlink transmissions to the two or more UEs. The operations of 2310 may be performed according to the methods described herein. In certain examples, aspects of the operations of 2310 may be performed by a ACK/NACK manager as described with reference to FIGS. 14 through 17.

At 2315 the base station 105 may dynamically switch a first UE of the two or more UEs from the first BWP to a second BWP different than the first BWP for the associated retransmission to the first UE, the switching based at least in part on a number of UEs of the first BWP and the second BWP that have associated retransmissions. The operations of 2315 may be performed according to the methods described herein. In certain examples, aspects of the operations of 2315 may be performed by a DL resource configuration manager as described with reference to FIGS. 14 through 17.

At 2320 the base station 105 may identify a group length corresponding to a first number of UEs of a second subset of UEs associated with the second BWP plus the first UE. The operations of 2320 may be performed according to the methods described herein. In certain examples, aspects of the operations of 2320 may be performed by a BWP group length component as described with reference to FIGS. 14 through 17.

At 2325 the base station 105 may identify a second number of UEs that are to receive downlink retransmissions via the second BWP based at least in part on the downlink resource configuration. The operations of 2325 may be performed according to the methods described herein. In certain examples, aspects of the operations of 2325 may be performed by a BWP group length component as described with reference to FIGS. 14 through 17.

At 2330 the base station 105 may transmit the group length and the second number of UEs to the two or more UEs in a group downlink control message. The operations of 2330 may be performed according to the methods described herein. In certain examples, aspects of the operations of 2330 may be performed by a BWP group length component as described with reference to FIGS. 14 through 17.

Figure 24:
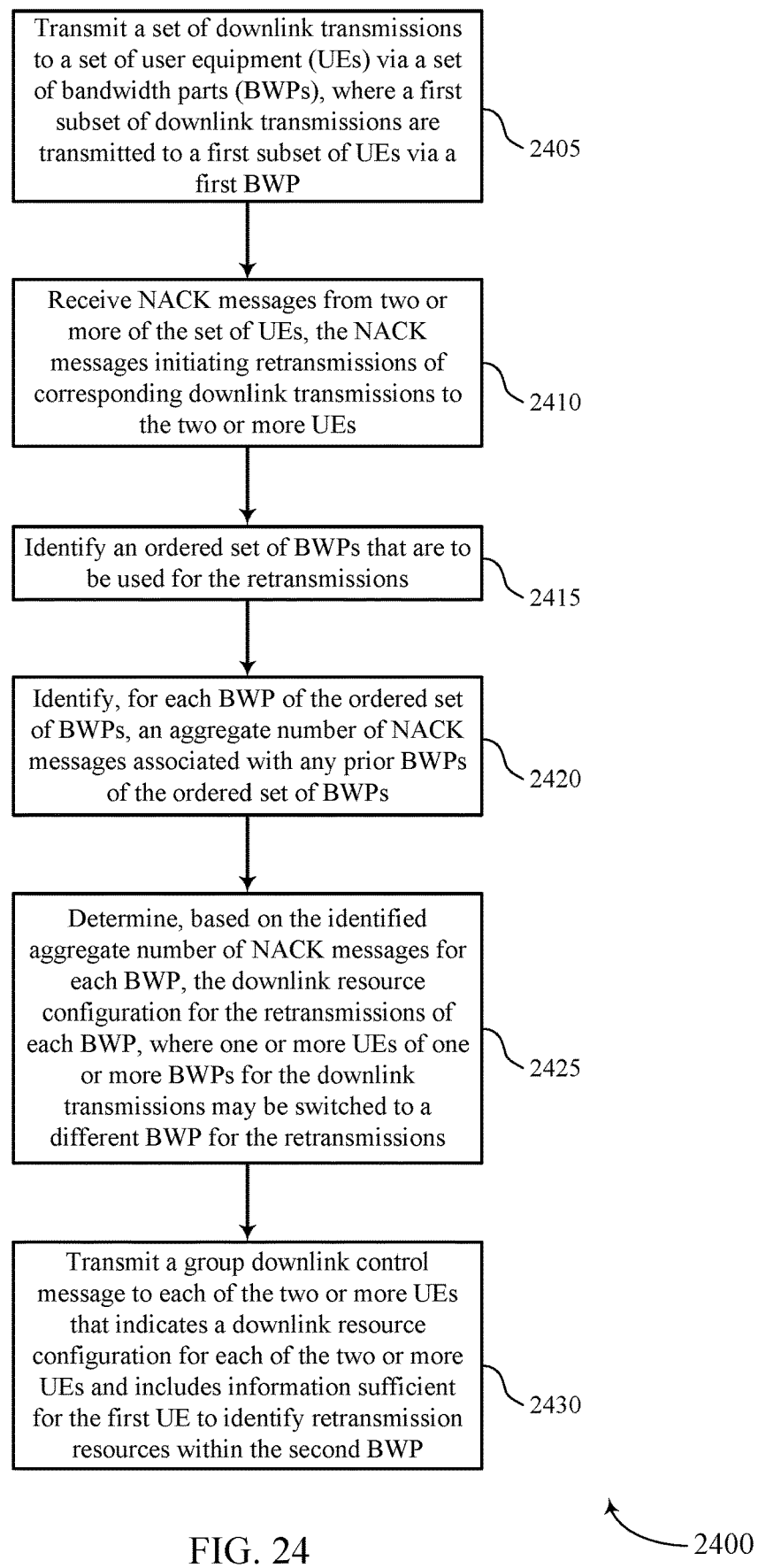

FIG. 24 shows a flowchart illustrating a method 2400 for group common control channel and bandwidth part management in wireless communications in accordance with aspects of the present disclosure. The operations of method 2400 may be implemented by a base station 105 or its components as described herein. For example, the operations of method 2400 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2405 the base station 105 may transmit a plurality of downlink transmissions to a plurality of UEs via a plurality of BWPs, where a first subset of downlink transmissions are transmitted to a first subset of UEs via a first BWP. The operations of 2405 may be performed according to the methods described herein. In certain examples, aspects of the operations of 2405 may be performed by a SPS manager as described with reference to FIGS. 14 through 17.

At 2410 the base station 105 may receive NACK messages from two or more of the plurality of UEs, the NACK messages initiating retransmissions of corresponding downlink transmissions to the two or more UEs. The operations of 2410 may be performed according to the methods described herein. In certain examples, aspects of the operations of 2410 may be performed by a ACK/NACK manager as described with reference to FIGS. 14 through 17.

At 2415 the base station 105 may identify an ordered set of BWPs that are to be used for the retransmissions. The operations of 2415 may be performed according to the methods described herein. In certain examples, aspects of the operations of 2415 may be performed by a BWP determination component as described with reference to FIGS. 14 through 17.

At 2420 the base station 105 may identify, for each BWP of the ordered set of BWPs, an aggregate number of NACK messages associated with any prior BWPs of the ordered set of BWPs. The operations of 2420 may be performed according to the methods described herein. In certain examples, aspects of the operations of 2420 may be performed by a BWP determination component as described with reference to FIGS. 14 through 17.

At 2425 the base station 105 may determine, based at least in part on the identified aggregate number of NACK messages for each BWP, the downlink resource configuration for the retransmissions of each BWP, where one or more UEs of one or more BWPs for the downlink transmissions may be switched to a different BWP for the retransmissions. The operations of 2425 may be performed according to the methods described herein. In certain examples, aspects of the operations of 2425 may be performed by a BWP determination component as described with reference to FIGS. 14 through 17.

At 2430 the base station 105 may transmit a group downlink control message to each of the two or more UEs that indicates a downlink resource configuration for each of the two or more UEs and includes information sufficient for the first UE to identify retransmission resources within the second BWP. The operations of 2430 may be performed according to the methods described herein. In certain examples, aspects of the operations of 2430 may be performed by a retransmission manager as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting a negative acknowledgement (NACK) message associated with a downlink transmission from a base station, the downlink transmission having resources in a first bandwidth part (BWP) of a plurality of BWPs configured for downlink transmissions;
   receiving, responsive to the NACK message, a group downlink control message indicating a downlink resource configuration for a retransmission of the downlink transmission within a second BWP different from the first BWP; and
   receiving the retransmission of the downlink transmission via the second BWP based at least in part on the downlink resource configuration.

2. The method of claim 1, wherein the receiving the group downlink control message further comprises:
   identifying a group length corresponding to a first number of UEs in a set of UEs that are to receive downlink retransmissions via the second BWP;
   determining the downlink resource configuration based at least in part on the group length and an indication of a second number of UEs of the set of UEs that are to receive the downlink retransmissions via the second BWP; and
   determining a resource assignment for the retransmission of the downlink transmission based at least in part on the downlink resource configuration.

3. The method of claim 2, wherein the second number of UEs of the set of UEs that are to receive downlink transmissions via the second BWP are indicated in a bitmap within the group downlink control message.

4. The method of claim 2, wherein the group length of at least one of the first BWP or the second BWP is updated based at least in part on a first UE having resources in the first BWP for the downlink transmission and having resources in the second BWP for the retransmission.

5. The method of claim 2, wherein the group length of the first BWP remains the same when a first UE has resources in the first BWP for the downlink transmission and has resources in the second BWP for the retransmission, and a third number of UEs of a second set of UEs that are to receive downlink retransmissions via the first BWP is updated based at least in part on the first UE having resources in the second BWP for the retransmission.

6. The method of claim 1, wherein the receiving the group downlink control message further comprises:
   identifying an aggregate number of NACK messages associated with one or more BWPs that are ordered ahead of the first BWP;
   determining, based at least in part on the identified aggregate number of NACK messages, the downlink resource configuration for the retransmission of the downlink transmission; and
   switching, based at least in part on the downlink resource configuration, to the second BWP.

7. The method of claim 6, wherein the receiving the group downlink control message further comprises:
   determining, based at least in part on an indication in a bitmap within the group downlink control message, a number of UEs within the first BWP that are to receive downlink retransmissions, and wherein the switching is further based at least in part on the bitmap.

8. The method of claim 1, further comprising:
   receiving an indication of one or more rules to be applied to information included in the group downlink control message in identifying the downlink resource configuration to be used for the retransmission of the downlink transmission.

9. The method of claim 8, wherein at least one rule includes one or more of:
   evenly dividing a set of available resources within the second BWP between one or more UEs that are to receive retransmissions via the second BWP;
   dividing a set of available resources within the second BWP between one or more UEs that are to receive retransmissions via the second BWP, the dividing based at least in part on a number of resource blocks that are associated with each UE of the one or more UEs; or
   selecting, from a preconfigured table of available downlink resource configurations for different BWPs, the downlink resource configuration based at least in part on a number of UEs that are to receive retransmissions via the second BWP.

10. A method for wireless communication, comprising:
    transmitting a plurality of downlink transmissions to a plurality of user equipment (UEs) via a plurality of bandwidth parts (BWPs), wherein a first subset of downlink transmissions are transmitted to a first subset of UEs via a first BWP;
    receiving negative acknowledgement (NACK) messages from two or more of the plurality of UEs, the NACK messages initiating retransmissions of corresponding downlink transmissions to the two or more UEs;
    dynamically switching a first UE of the two or more UEs from the first BWP to a second BWP different than the first BWP for the associated retransmission to the first UE, the switching based at least in part on a number of UEs of the first BWP and the second BWP that have associated retransmissions; and
    transmitting a group downlink control message to each of the two or more UEs that indicates a downlink resource configuration for each of the two or more UEs and includes information sufficient for the first UE to identify retransmission resources within the second BWP.

11. The method of claim 10, further comprising:
retransmitting the downlink transmission of the first UE using the second BWP; and
transmitting, after the retransmitting, a second plurality of downlink transmissions to the plurality of UEs, the second plurality of downlink transmissions including a second downlink transmission to the first UE that is transmitted using the first BWP.

12. The method of claim 10, wherein the transmitting the group downlink control message further comprises:
identifying a group length corresponding to a first number of UEs of a second subset of UEs associated with the second BWP plus the first UE;
identifying a second number of UEs that are to receive downlink retransmissions via the second BWP based at least in part on the downlink resource configuration; and
transmitting the group length and the second number of UEs to the two or more UEs.

13. The method of claim 12, wherein the second number of UEs that are to receive downlink transmissions via the second BWP are indicated in a bitmap within the group downlink control message.

14. The method of claim 12, wherein the group length of one or more of the first BWP or the second BWP is updated from a prior group length of the first BWP or the second BWP based at least in part on the first UE having resources in the second BWP for the retransmissions.

15. The method of claim 12, wherein the group length of the first BWP remains the same as a prior group length of the first BWP when the first UE has resources in the second BWP for the retransmissions, and a third number of UEs that are to receive downlink retransmissions via the first BWP is updated based at least in part on the first UE having resources in the second BWP for the retransmissions.

16. The method of claim 10, wherein the transmitting the group downlink control message further comprises:
identifying an ordered set of BWPs that are to be used for the retransmissions;
identifying, for each BWP of the ordered set of BWPs, an aggregate number of NACK messages associated with any prior BWPs of the ordered set of BWPs; and
determining, based at least in part on the identified aggregate number of NACK messages for each BWP, the downlink resource configuration for the retransmissions of each BWP, wherein one or more UEs of one or more BWPs for the downlink transmissions may be switched to a different BWP for the retransmissions.

17. The method of claim 16, wherein the downlink resource configuration further comprises a bitmap within the group downlink control message for each BWP that indicates a number of UEs within each BWP that are to receive downlink retransmissions, and the determining is further based at least in part on the bitmap.

18. The method of claim 10, further comprising:
transmitting an indication of one or more rules to be applied to information included in the group downlink control message for identifying the downlink resource configuration to be used for the retransmissions.

19. The method of claim 18, wherein at least one rule includes one or more of:
evenly dividing a set of available resources within each BWP between one or more UEs that are to receive the retransmissions via the BWP; or dividing a set of available resources within each BWP between one or more UEs that are to receive the retransmissions via the BWP, the dividing based at least in part on a number of resource blocks that are associated with each UE.

20. The method of claim 18, further comprising:
selecting, from a preconfigured table of available downlink resource configurations for different BWPs, the downlink resource configuration based at least in part on a number of UEs that are to receive the retransmissions via each BWP.

21. An apparatus for wireless communication, comprising:
a processor;
memory coupled with the processor; and
instructions stored in the memory and executable by the processor to cause the apparatus to:
transmit a negative acknowledgement (NACK) message associated with a downlink transmission from a base station, the downlink transmission having resources in a first bandwidth part (BWP) of a plurality of BWPs available configured for downlink transmissions;
receive, responsive to the NACK message, a group downlink control message indicating a downlink resource configuration for a retransmission of the downlink transmission within a second BWP different from the first BWP; and
receive the retransmission of the downlink transmission via the second BWP based at least in part on the downlink resource configuration.

22. The apparatus of claim 21, wherein the instructions are further executable by the processor to cause the apparatus to:
identify a group length corresponding to a first number of UEs in a set of UEs that are to receive downlink retransmissions via the second BWP;
determine the downlink resource configuration based at least in part on the group length and an indication of a second number of UEs of the set of UEs that are to receive the downlink retransmissions via the second BWP; and
determine a resource assignment for the retransmission of the downlink transmission based at least in part on the downlink resource configuration.

23. The apparatus of claim 22, wherein the group length of the first BWP remains the same when a first UE has resources in the first BWP for the downlink transmission and has resources in the second BWP for the retransmission, and a third number of UEs of a second set of UEs that are to receive downlink retransmissions via the first BWP is updated based at least in part on the first UE having resources in the second BWP for the retransmission.

24. The apparatus of claim 21, wherein the instructions are further executable by the processor to cause the apparatus to:
identify an aggregate number of NACK messages associated with one or more BWPs that are ordered ahead of the first BWP;
determine, based at least in part on the identified aggregate number of NACK messages, the downlink resource configuration for the retransmission of the downlink transmission; and
switch, based at least in part on the downlink resource configuration, to the second BWP.

25. The apparatus of claim 24, wherein the instructions are further executable by the processor to cause the apparatus to:
  determine, based at least in part on an indication in a bitmap within the group downlink control message, a number of UEs within the first BWP that are to receive downlink retransmissions, and wherein the switching is further based at least in part on the bitmap.

26. An apparatus for wireless communication, comprising:
  a processor;
  memory coupled with the processor; and
  instructions stored in the memory and executable by the processor to cause the apparatus to:
    transmit a plurality of downlink transmissions to a plurality of user equipment (UEs) via a plurality of bandwidth parts (BWPs), wherein a first subset of downlink transmissions are transmitted to a first subset of UEs via a first BWP;
    receive negative acknowledgement (NACK) messages from two or more of the plurality of UEs, the NACK messages initiating retransmissions of corresponding downlink transmissions to the two or more UEs;
    dynamically switch a first UE of the two or more UEs from the first BWP to a second BWP different than the first BWP for the associated retransmission to the first UE, the switching based at least in part on a number of UEs of the first BWP and the second BWP that have associated retransmissions; and
    transmit a group downlink control message to each of the two or more UEs that indicates a downlink resource configuration for each of the two or more UEs and includes information sufficient for the first UE to identify retransmission resources within the second BWP.

27. The apparatus of claim 26, wherein the instructions are further executable by the processor to cause the apparatus to:
  retransmit the downlink transmission of the first UE using the second BWP; and
  transmit, after the retransmitting, a second plurality of downlink transmissions to the plurality of UEs, the second plurality of downlink transmissions including a second downlink transmission to the first UE that is transmitted using the first BWP.

28. The apparatus of claim 26, wherein the instructions are further executable by the processor to cause the apparatus to:
  identify a group length corresponding to a first number of UEs of a second subset of UEs associated with the second BWP plus the first UE;
  identify a second number of UEs that are to receive downlink retransmissions via the second BWP based at least in part on the downlink resource configuration; and
  transmit the group length and the second number of UEs to the two or more UEs.

29. The apparatus of claim 28, wherein the second number of UEs that are to receive downlink transmissions via the second BWP are indicated in a bitmap within the group downlink control message.

30. The apparatus of claim 26, wherein the instructions are further executable by the processor to cause the apparatus to:
  identify an ordered set of BWPs that are to be used for the retransmissions;
  identify, for each BWP of the ordered set of BWPs, an aggregate number of NACK messages associated with any prior BWPs of the ordered set of BWPs; and
  determine, based at least in part on the identified aggregate number of NACK messages for each BWP, the downlink resource configuration for the retransmissions of each BWP, wherein one or more UEs of one or more BWPs for the downlink transmissions may be switched to a different BWP for the retransmissions.

* * * * *